United States Patent [19]
Sakakibara et al.

[11] Patent Number: 5,903,128
[45] Date of Patent: May 11, 1999

[54] SENSORLESS CONTROL SYSTEM AND METHOD OF PERMANENT MAGNET SYNCHRONOUS MOTOR

[75] Inventors: Hiroyuki Sakakibara, Hekinan; Tomoya Okuno, Okazaki; Kazuyoshi Obayashi; Hiroya Tsuji, both of Kariya, all of Japan

[73] Assignees: Denso Corporation, Kariya; Nippon Soken, Inc., Nishio, both of Japan

[21] Appl. No.: 08/792,736

[22] Filed: Jan. 31, 1997

[30] Foreign Application Priority Data

Feb. 1, 1996 [JP] Japan .................................. 8-016341
Feb. 22, 1996 [JP] Japan .................................. 8-062078

[51] Int. Cl.$^6$ ........................................................ H02P 6/16
[52] U.S. Cl. ........................................... 318/721; 318/439
[58] Field of Search .................................... 318/700, 705, 318/720, 721, 722, 724, 138, 254, 439

[56] References Cited

U.S. PATENT DOCUMENTS

| | | | |
|---|---|---|---|
| 5,504,404 | 4/1996 | Tamaki et al. | 318/432 |
| 5,598,081 | 1/1997 | Okamura et al. | 318/801 |
| 5,656,911 | 8/1997 | Nakayama et al. | 318/718 |

FOREIGN PATENT DOCUMENTS 2-179277  7/1990  Japan .

OTHER PUBLICATIONS

"A Sensorless Detecting Strategy of Rotor Position and Speed on Permanent Magnet Synchronous Motor" by H. Watanabe et al; T.IEE Japan, vol. 110–D, No. 11, 1990; pp., 1193–1200 (w/English abstract).

*Primary Examiner*—Bentsu Ro
*Attorney, Agent, or Firm*—Pillsbury Madison & Sutro, LLP

[57] ABSTRACT

If the magnitude of a voltage command vector to a motor driver is smaller than a preset value in a control period, in each of a predetermined number of subsequent control periods (a compensation period), a pulse voltage vector is added to the voltage command vector so as to make substantially zero the average value of the added pulse voltage vectors during the compensation periods, and the compensated voltage command vector is used for the subsequent calculation. Also, two direction data for each phase winding are stored at the center of each of the two dead times following the edges of a voltage command pulse in each control period. An estimated phase voltage is calculated from the last voltage command pulse width, a phase voltage fluctuation during the two dead time of each control period and the stored direction data. The rotor position angle is precisely calculated from the estimated phase voltage.

12 Claims, 14 Drawing Sheets

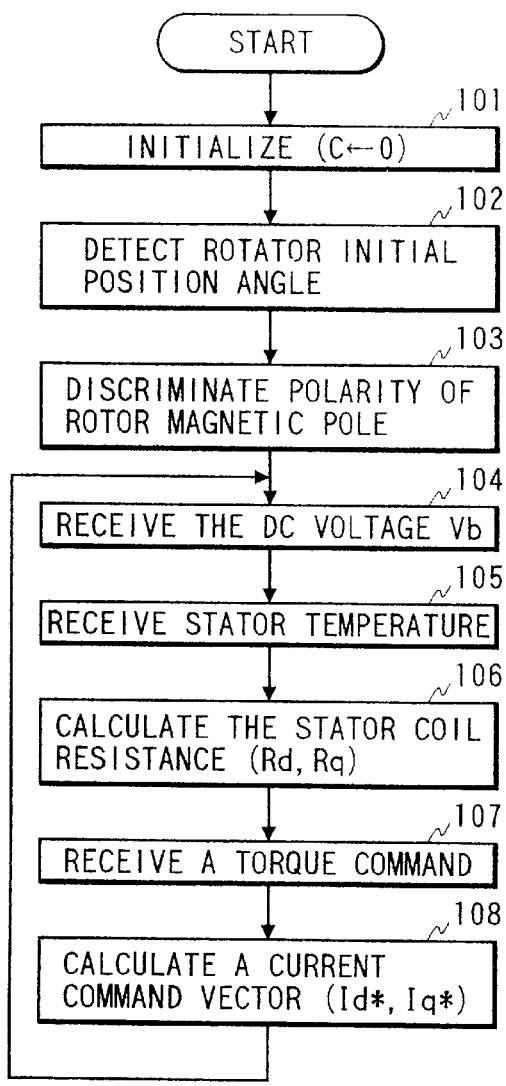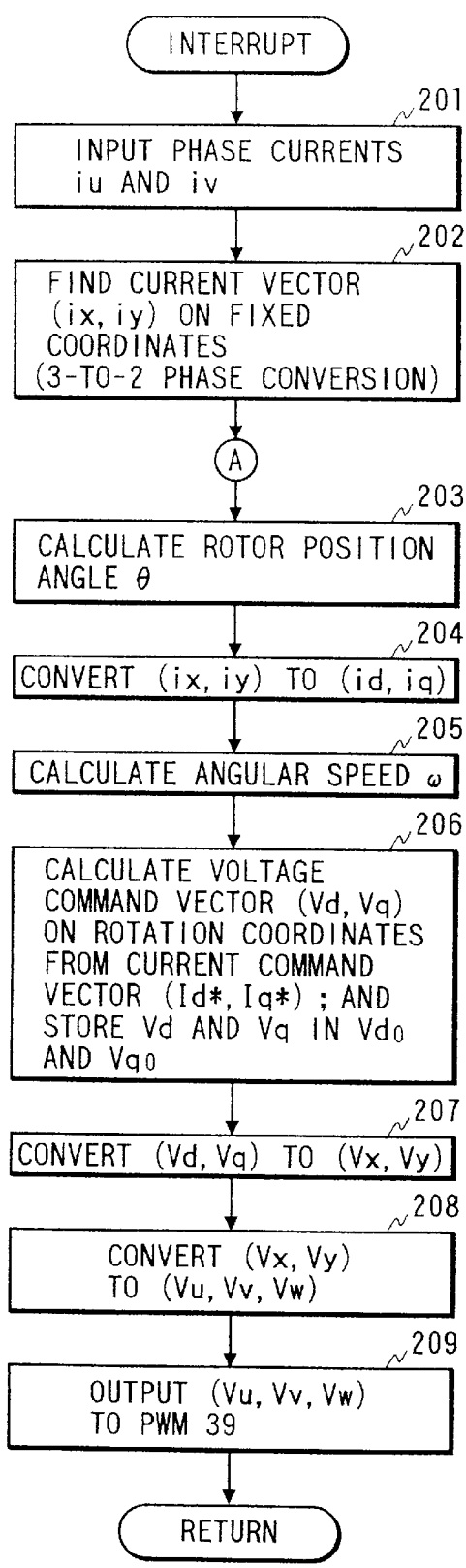

SENSORLESS CONTROL SYSTEM AND METHOD OF PERMANENT MAGNET SYNCHRONOUS MOTOR

BACKGROUND OF THE INVENTION

1. Field of the Invention

The present invention relates to a sensorless control system and method of the permanent magnet synchronous motor and, in particular, to a sensorless control system which enables precise control and precise detection of rotor position and speed in a low speed operation of the motor.

2. Description of the Prior Art

The article "A Sensorless Detecting Strategy of Rotor Position and Speed on Permanent Magnet Synchronous Motor" by H. Watanabe et al. appearing in the Electric Society Transactions D, Vol. 110, No. 11, 1990, at pages 1193–1200, discloses an arrangement in which torque control of a permanent magnet synchronous motor (PM motor) driven with AC voltages into which an inverter has converted a DC voltage is achieved without using a sensor for detecting the rotor position angle. Specifically, the position angle and the angular velocity of rotor is obtained through a calculation based on the voltage equation of permanent magnet synchronous motor. A voltage command vector is calculated from the position angle, the angular velocity and a torque command given from the outside, and the inverter applies the AC voltages according to the vector command vector.

A phase winding voltage is necessary to calculate the rotor position angle and angular velocity on the basis of the above mentioned voltage equation, whereas there is a simplified system in which a voltage detecting device is omitted substituting the voltage command vector for it.

In this kind of motor control system, when a pair of series connected switching elements in the inverter is switched, in order to prevent the switching elements from shorting, the switching times of the switching elements are a bit staggered so as to provide a time period when both the switching elements are off (This time period is called a "dead time."). A phase current of the phase in a dead time is detected. The phase voltage of the phase in the dead time is estimated from the detected phase current and used for the calculation of voltage command vector.

However, the smaller the phase current becomes, the larger the estimation error of the phase voltage becomes due to the influence of ripple current etc. Especially if the magnitude of the voltage command vector is small, then the error between the voltage command vector and the actually applied voltage becomes large relatively to the voltage command vector, making it difficult or even impossible to calculate the precise position angle of the rotor.

Japanese Patent Unexamined Publication No. He12-179,277 (1990) discloses a compensation technique of the error voltage caused by the dead time of the inverter. In this technique, an offset current value is added to discretely obtained current values so as to make the current direction the same as the actual current direction. Determining the direction of the current based on the offset current value, a dead time compensation is achieved based on the determined current direction.

However, the above mentioned dead time voltage error compensation technique does not necessary perform precise dead time compensation, makes the system constitution complicated, and requires a expensive device such as an insulation amplifier for voltage measurement.

It is therefore an object of the invention to provide a sensorless control system and method of PM meter which is capable of precisely controlling the torque even if the voltage command vector is small or the motor is operated at a low speed.

It is another object of the invention to provide a sensorless control system and method of PM motor which is capable of precisely calculating the rotor position angle and angular velocity by precisely compensating a voltage error due to a dead time with a simplified arrangement without the need of an expensive device such as an insulation amplifier.

SUMMARY OF THE INVENTION

According to one aspect of the invention, if the magnitude of a voltage command vector thereby to indicate to a driver a phase voltage to be applied to a PM motor is smaller than a preset lower limit in a certain control period, than in a predetermined number of control periods from the certain control period (hereinafter, referred to en bloc as a "compensation period"), a series of compensation processes are executed. In each of the control periods of the compensation period, a pulse voltage vector is added to the voltage command vector so as to make substantially zero the average value of the added pulse voltage vectors during the compensation period, and the compensation voltage command vector is used as voltage command vector for the subsequent calculation. The error between the compensated voltage command vector and the actually applied voltage is smaller than the error between the uncompensated voltage command vector and the actually applied voltage. Since the average value of the added pulse voltage vectors during the compensation period is zero, the phase currents and the torque is restored to the states before the compensation period.

According to another aspect of the invention, a current direction signal for each phase winding is generated by a voltage comparator, and stored in two D-type flip-flops at the center of each of the two dead times following the rising and the falling edges of a voltage command pulse in each control period. An estimated phase voltage which is presumed to have been applied to each phase winding during the last control period is calculated on the basis of the pulse width of the last voltage command pulse, an average fluctuation in phase voltage during the two dead time of each control period, and the current direction signals stored in the two flip-flops. The rotor position angle is precisely calculated by using the estimated phase voltage.

BRIEF DESCRIPTION OF THE DRAWING

Further objects and advantages of the present invention will be apparent from the following description of the preferred embodiments of the invention as illustrated in the accompanying drawings. In the drawing.

FIGS. 2A and 2B are flow charts showing procedures executed by the DSP of FIG. 1 under the control of exemplary programs of a conventional sensorless control system stored in ROM shown in FIG. 1; the program for FIG. 2A being invoked by a start or reset of the system and the program for FIG. 2B is invoked by an interrupt;

DETAILED DESCRIPTION OF THE PREFERRED EMBODIMENTS

Figure 1:
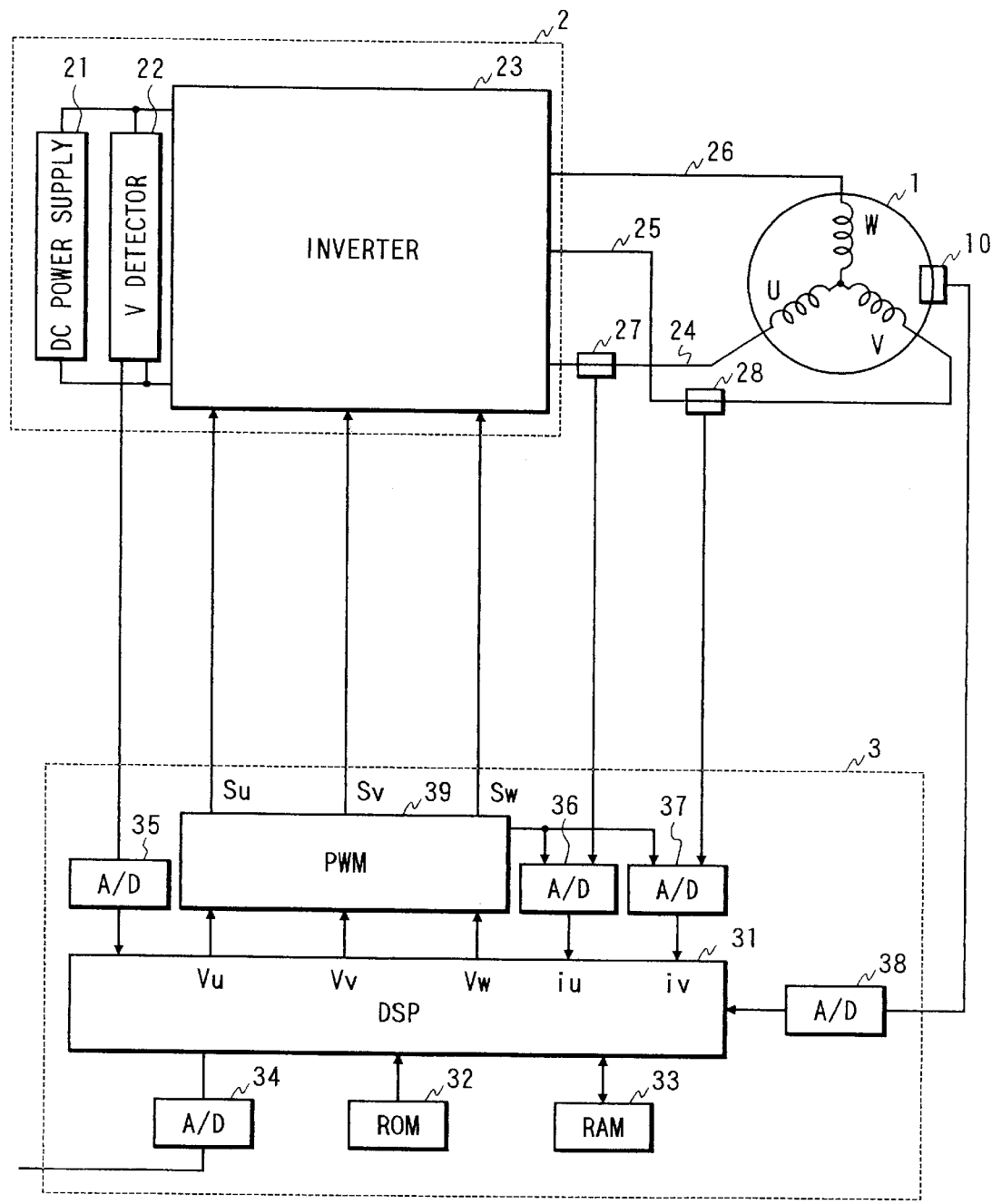
FIG. 1 is a block diagram of a permanent magnet synchronous motor system to which the following sensorless control methods according to an aspect of the invention can be applied.

FIG. 1 is a block diagram of a permanent magnet (PM) synchronous motor system to which the following sensorless control methods according to an aspect of the invention can be applied. In FIG. 1, the PM motor system comprises a PM synchronous motor or motor 1, a power supply 2 for generating an ac power to drive the motor 1 and a controller 3 for controlling the power supply 2.

The motor 1 has a 3-phase configuration and is provided with a thermal sensor 10 for detecting the temperature of the stator. The power supply 2 comprises a dc power supply 21, a voltage detector (V DETECTOR) 22 for detecting the dc voltage of the dc power supply 21, and an inverter 23 for converting the dc voltage into 3 phase voltages and applying the 3 phase voltages Vu, Vv and Vw to the phase windings U, V, and W of the motor 1 through feeders 24 through 26, respectively. The feeders 24 and 25 are provided in their half way with current detectors 27 and 28 for detecting phase currents iu and iv, respectively.

The controller 3 comprises a digital signal processor (DSP) 31 for controlling the motor 1 at certain control periods; a read only memory (ROM) 32 for storing a program under the control of which DSP 31 operates; a random access memory (RAM) 33 for temporary storing data DSP 31 uses; A/D converters 34 through 38 through which DSP 31 receives an analog torque command signal from the outside, the dc voltage information from the V DETECTOR 22, phase currents iu and iv from the current detectors 27 and 28, and the stator temperature from the thermal sensor 10, respectively; and a pulse width modulator (PWM) 39 for supplying the inverter 23 with signals Su, Sv and Sw pulse-width-modulated in response to a voltage command vector (Vu, Vv, Vw) from DSP 31 by means of triangular wave comparing. Though the A/D converters 34 through 38 are denoted by different numerals for the discrimination, the converters 34 through 38 may be the same in function and structure.

DSP 31 calculates the components of the voltage command vector, that is, command values Vu, Vv and Vw of the phase voltages to be applied to the phase windings U, V and W of the motor 1 by using the signals received from the above mentioned A/D converters 34 through 38 as described in detail later. The inverter 23 generates the 3 phase voltages in response to the signals Su, Sv and Sw, that is, the voltage command vector (Vu, Vv, Vw).

For the purpose of better understanding of the invention, only a conventional operation of the motor system which have not included the feature of the invention. FIG. 2A and 2B are flow charts showing procedures executed by the DSP of FIG. 1 under the control of exemplary programs of a conventional sensorless control system stored in ROM shown in FIG. 1. The program for FIG. 2A is invoked by a start or reset of the system and the program for FIG. 2B is invoked by an interrupt from the A/D converters 36 and 37.

When the system is started or reset, DSP 31 begins the procedure of FIG. 2A from step 101 to initialize the hardware and control variables such as a pulse count c used in an interrupt routine as described later. In this example, the pulse count c is set for 0. In step 102, DSP 31 detects the initial position angle of the rotor.

In step 103, the polarity of magnetic pole of the rotor is discriminated. The discrimination of the polarity is achieved by applying a positive and a negative instantaneous voltage to stator coils and observing a change in the phase currents responsive to the applied voltages. If a voltage is applied to phase winding, the stator core (not shown) is magnetized or demagnetized depending on the polarity of the field magnet pole. A nonlinearity of the magnetizing characteristic of stator core cause the phase currents detected in case of magnetization and demagnetization to differ in magnitude. The polarity of rotor magnetic pole is discriminated on the basis of a combination of the polarity of the voltage applied to a stator coil and the magnitude of the detected phase current.

Then, DSP 31 takes in the dc voltage from the V detector 22 via the A/D converter 35 in step 104 and takes in the stator temperature from the thermal sensor 10 via the A/D converter 38 in step 105. In step 106, the stator coil resistance at the stator temperature is obtained by compensating the initial value of the stator coil resistance stored in the ROM 32 on the basis of the taken-in stator temperature.

DSP 31 takes in the torque command signal from the outside via the A/D converter 34 in step 107 and converts, in step 108, the torque command into a current command vector (Id*, Iq*) defined on rotary coordinates or coordinates comprising a d-axis (the direction of field magnetic pole) and a q-axis (perpendicular to the d-axis) which are stationary with respect to the rotor of the motor 1, that is, rotate with the rotor. The steps 104 through 108 are executed in the periods other than interrupt process periods and supplies the interrupt process with the current command vector (Id*, Iq*) and the stator coil resistor value.

If the A/D converters 36 and 37 complete the conversion from the detected analog phase voltage to a digital signal, then the converters 36 and 37 issues an interrupt signal to DSP 31. Then DSP 31 starts the procedure of FIG. 2B.

DSP 31 first takes in 3-phase currents iu and iv defined on fixed coordinates via the A/D converters 36 and 37, respectively, in step 201 and converts the 3-phase currents iu and iv into a current vector (ix, iy) defined on coordinates which are stationary with respect to the stator of the motor 1 (fixed coordinates) in step 202.

Note that a mark "A" enclosed with a circle in the path between steps 202 and 203 indicates that the routines which will be introduced later are to be inserted in the path.

Then, DSP 31 proceeds to step 203, where the position angle θ of the rotor is calculated. A well known voltage-current equation on the PM motor is used for this calculation. Specifically, the voltage-current equation for a motor revolving at an angular speed of ω is expressed by using the d-q coordinates as follows:

$$vd=(Rd+pLd)id-\omega Lqiq \quad (1)$$

$$vq=\omega Ldid+(Rq+pLq)iq+\omega\phi f, \quad (2)$$

where vd and vq are voltage components in the directions of d and q coordinates, respectively; id and iq are current components in the directions of d and q coordinates; Rd and Rq are stator resistances found in step 106 of FIG. 2A, Ld and Lq are d and q coordinate components of the stator inductance which have been stored in ROM 32; p is a differential operator; φf is a field magnetic flux. Since the voltage vectors (vd, vq) and (vx, vy) and the current vectors (id, iq) and (ix, iy) satisfies the following equations:

$$vd=vy\cdot\cos\theta+vx\cdot\sin\theta$$

$$vq=-vy\cdot\sin\theta+vx\cdot\cos\theta$$

$$id=iy\cdot\cos\theta+ix\cdot\sin\theta$$

$$iq=-iy\cdot\sin\theta+ix\cdot\cos\theta \quad (3)$$

substituting these equations in the equation (1) and solving the resultant equation with respect to tanθ yields $$\tan\theta = \frac{Vy-(Rd+pLd)iy+\omega(Lq-Ld)ix}{-Vx+(Rd+pLd)ix+\omega(Lq-Ld)iy} \quad (4)$$

Thus, the rotor position angle θ can be calculated from the equation (4). In this calculation, for ix and iy, the found values in step 202 for ix and iy are used; for pix and piy, the differences obtained by subtracting ix and iy of the previous control period from the just found values in step 202 are used; for the angular speed ω, the value calculated in step 205, to be detailed later, of the previous control period is used; and for Vx and Vy, the values calculated in step 207, to be detailed later, of the previous control period are used. Though the position angle θ takes two values in the range −x≦θ<π, since the value has been uniquely determined on the basis of the polarity of magnetic polar having been discriminated at the start time in the first time, after the start of operation, of calculation of the angular speed, the angular speed is so determined as to be continuous from the previous value in the subsequent control periods.

In step 204, the current vector (ix, iy) on the fixed coordinates is converted into 2-phase current vector (id, iq) on the rotary coordinates according to the equation (3). In this case, the calculation result in step 203 is used for θ.

In step 205, the angular speed ω is calculated from the following equation:

$$\omega=\{Vq-(Rq+pLd)iq\}/(Ldid+\phi a) \quad (5)$$

The value having been calculated in step 206 (which will be described later) of the previous control period is used for Vq. φa is the rotor magnetic flux which is stored in ROM 32.

In step 206, a 2-phase voltage command (Vd, Vq) is calculated through a well-known PI control algorithm from the current command vector (Id*, Iq*) having been calculated in step 108 of FIG. 2A, and stored in locations Vd0 and Vq0. Also, the magnitude V of the voltage command vector (Vd, Vq) is calculated as follows.

$$V=\{(Vd0)^2+(Vq0)^2\}^{1/2} \quad (6)$$

In step 207, the voltage command vector (Vd, Vq) on the rotary coordinates is converted into the vector (Vx, Vy) on the fixed coordinates according to the following equations:

$$Vx=Vd\cdot\cos\theta-Vq\cdot\sin\theta$$

$$Vy=Vd\cdot\sin\theta+Vq\cdot\cos\theta$$

Subsequently, DSP 31 converts the 2-phase voltage command vector (Vx, Vy) into the 3-phase voltage command vector (Vu, Vv, Vw) in step 208, outputs the latter to the PWM 39 in step 209, and returns to the procedure of FIG. 2A.

On receiving the voltage command vector (Vu, Vv, Vw), the PWM 39 outputs a synchronous signal to the A/D converters 36 and 37. In response to the synchronous signal, the A/D converters 36 and 37 convert the phase currents from the current detectors 27 and 28 into digital current values and, again, issue an interrupt to DSP 31 on completing the A/D conversion. In this way, the interrupt routine of FIG. 2B is periodically executed.

Embodiment I

Figure 3:
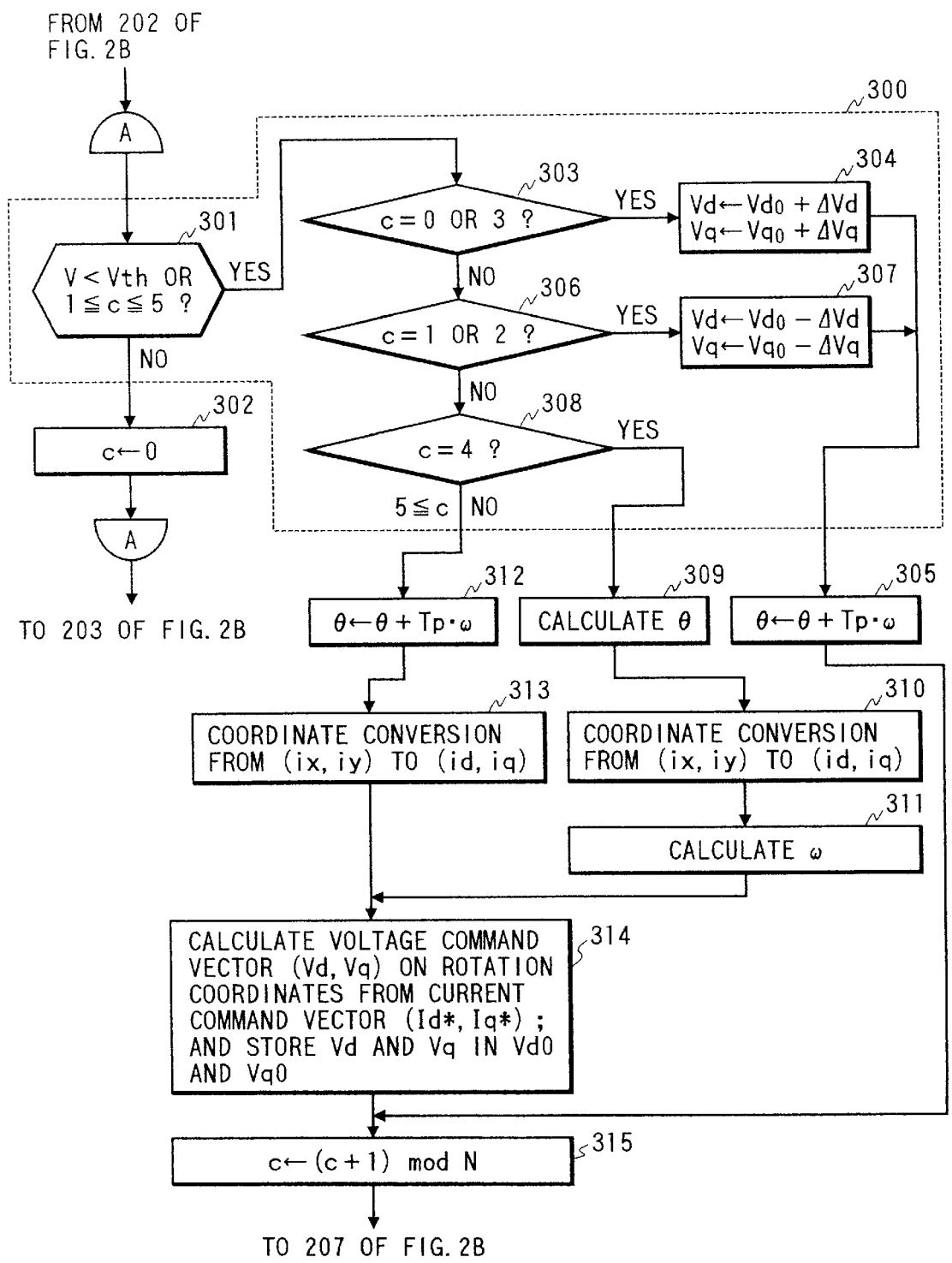
FIG. 3 is a flow chart of a routine which, when combined with the program for FIG. 2B, constitutes a novel interrupt routine embodying a first sensorless control method according to an aspect of the invention.

A first sensorless control method of the PM motor according to an aspect of the invention will be described in the following. FIG. 3 is a flow chart of a routine which, when combined with the program for FIG. 2B, constitutes a novel interrupt routine embodying a first sensorless control method according to an aspect of the invention. Following the step 202 of FIG. 2B, DSP 31 proceeds to step 301, where DSP 31 makes tests to see if the magnitude V of the voltage command vector is less than a predetermined threshold or 1≦c≦5. If not, DSP 31 sets the pulse count c for 0, and proceeds to step 203 OF FIG. 2B. If the test result in step 301 is YES, DSP 31 proceeds to step 303 to enter a compensation period, which lasts as long as the test in step 301 is successful. In each control period of the compensation period, an auxiliary procedure is executed. The auxiliary procedure has steps 201, 202 and 207 through 209 in common with the usual procedure, differing from the usual procedure in the way of finding the position angle and the voltage command vector (Vd, Vq).

In step 303, the pulse count "c" is tested to see if C=0 or 3. Since the pulse count c is reset in step 302 as long as the usual procedure is executed, c=0 in step 303 in the first control period when the control flow has changed from the usual procedure to the auxiliary procedure, and accordingly the control is passed to step 304. In step 304, a pulse voltage vector (ΔVd, ΔVq) is added to the voltage command vector of the last control period, that is, (Vd0, Vq0), and the resultant vector is made the voltage command vector (Vd, Vq). Briefly, it follows that $$Vd=Vd0+\Delta Vd$$

$$Vq = Vq0 + \Delta Vq$$

Then DSP 31 proceeds to step 305, where assuming the angular speed ω to be constant, the current position angle θ is calculated from the value of θ found in the previous control period by means of linear extrapolation. Specifically, assuming that a control period=Tp, calculate $$\theta \leftarrow \theta + Tp \cdot \omega.$$

In step 315, the reminder obtained by dividing, by a natural number N (6≦N), the value of pulse count c after incrementing the count c, that is, (c+1)mod N is made the new pulse count c. Briefly, c←(c+1)mod N. Thus, the value of c is replaced with 1 in the first control period of a compensation period. It is noted that the natural number N is set for such a sufficiently large value (e.g., more than 20) as to cause the ripple torque due to the addition of pulse voltages to be negligible.

Then DSP 31 proceeds to step 207 of FIG. 2B, and thereafter executes the steps 207 through 209 on the basis of the position angle θ calculated in step 305 to convert the 2-phase voltage command vector (Vd, Vq) into the 3-phase voltage command vector (Vu, Vv, Vw) for output.

If the test result is NO in step 303, then DSP 31 proceeds from step 303 to step 306 to make another test to see if c=1 or 2. If so, then, proceeding to step 307, DSP 31 calculates $$Vd = Vd0 - \Delta Vd$$

$$Vq = Vq0 - \Delta Vq$$

where Vd0 and Vq0 are values of voltage command vector components which have been found and stored in the previous control period.

As described above, the voltage command vector components Vd and Vq changes, centering around Vd0 and Vq0, largely toward the positive in the first control period (c=0) of the compensation period and largely toward the negative in the next control period (c=1). In other words, each of the voltage command vector (Vd, Vq) component is compensated with a time-series of pulses the average of which is zero in a super-period comprising the first and the next periods. Then, DSP 31 calculates θ and thereafter executes the steps 207 through 209 on the basis of the calculated θ.

Since c is incremented in step 315 every control step, in the third control period (c=2), DSP 31 proceeds to step 307 via steps 303 and 306, resulting in a large swing of the Vd and Vq components toward the negative centering around Vd0 and Vq0. In the following control period (c=3), DSP 31 proceeds to step 304 via step 303, resulting in a large swing of the Vd and Vq components toward the positive centering around Vd0 and Vq0. Thus, each of the voltage command vector (Vd, Vq) component is compensated with a time-series of pulses the average of which is zero in a super-period comprising the two periods.

In this embodiment, the ratio of each component of the pulse voltage vectors ΔVd and ΔVq used for compensation in the first 4 control periods of the compensation period is 1:−1:−1:1, in which the pulse stream in the latter super-period is an inversion of the pulse stream in the former super-period, and the average value of each super-period is zero.

If c=4 after the above described 4 control periods, then DSP 31 proceeds to step 309 via steps 301, 303, 306 and 308. The steps 309, 310, 311 and 314 are identical to steps 203 through 206, respectively. In step 309, the position angle θ is calculated according to equation (4). In this case, θ is calculated with a better precision because the voltage command vector has been compensated into a larger value with the pulse voltage vector (ΔVd, ΔVq). Then DSP 31 converts (ix, iy) into (Id, iq) in step 310; calculates the angular speed ω based on the equation (5) in step 311; and calculates the voltage command vector (Vd, Vq) through the PI control, stores the (Vd, Vq) components in Vd0 and Vq0, and calculates the magnitude V of (Vd, Vq) in step 314.

Since the pulse count C=5 in the next control period, DSP 31 proceeds to step 312 via steps 303, 306 and 308. In step 312, the position angle θ is calculated from the values of θ and ω found in steps 309 and 311 in the previous control period by means of linear exterpolation. On the basis of the position angle θ, the current vector (ix, iy) is converted into (id, iq) in step 313, and the control is passed to step 314.

Since the pulse count c=6 (in case of 6<N) in the next control period, if the magnitude V of the voltage command vector is not smaller than a predetermined threshold Vth (V≧Vth) in step 301, then DSP 31 proceeds to step 203 of FIG. 2B through step 302 to go out of the auxiliary procedure and return to the usual procedure. However, if the magnitude V of the voltage command vector is still smaller than the threshold Vth (V<Vth) in step 301, then DSP 31 proceeds to step 312 via steps 303, 306 and 308. Thus, as long as V<Vth and c≦N−1 in the control periods (5≦c) following the fourth control period of the compensation period, DSP 31 executes the steps 312 through 314, that is, calculates the position angle θ, assuming the angular speed to be constant, by means of linear extrapolation and finds the vectors (id, iq) and (Vd, Vq) from the calculated values of θ and ω.

We have simulated operation of the above described sensorless control system. The PM motor to which we applied the simulation has two polar pairs, a d-axis inductance Ld of 8 mH, a q-axis inductance Lq of 18 mH, and a stator resistance Ra of 0.19 Ω (Since generally speaking Rd=Rq in the PM motor, each of Rd and Rq is denoted as Ra). The magnetic flux φa was 0.3 Wb, and a simulation condition or the revolution speed was constant and 30 rpm (assuming that the moment of inertia was sufficiently large). For the purpose of simplicity of calculation, it was assumed that there was no error in the detection of position angle and angular speed. The power supply voltage of the inverter 23 was 300 V. The ratio of short-preventing period or dead time to the PWM period was assumed to be 5%. The error voltage during the dead time was estimated to be 15 V. As for the magnitude of the pulse voltage vector ΔVq was set for two times of the error voltage, that is, 30 V. In order to prepare such a situation as an usual control procedure can not cope with, the torque command was set for 1 Nm so as to make the corresponding voltage command vector several voltage several volts in the magnitude.

Figure 4A:
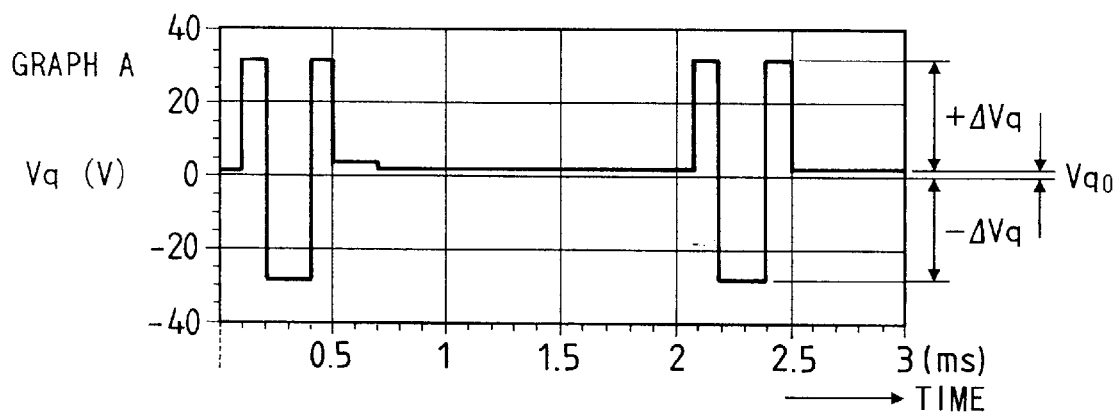
FIGS. 4A–4C are a graph for describing the first sensorless control method.
Figure 4B:
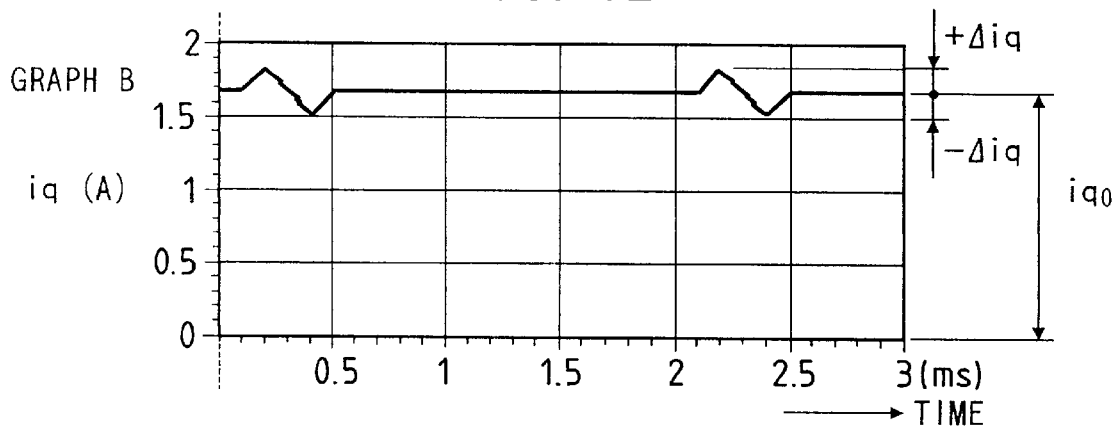
Figure 4C:
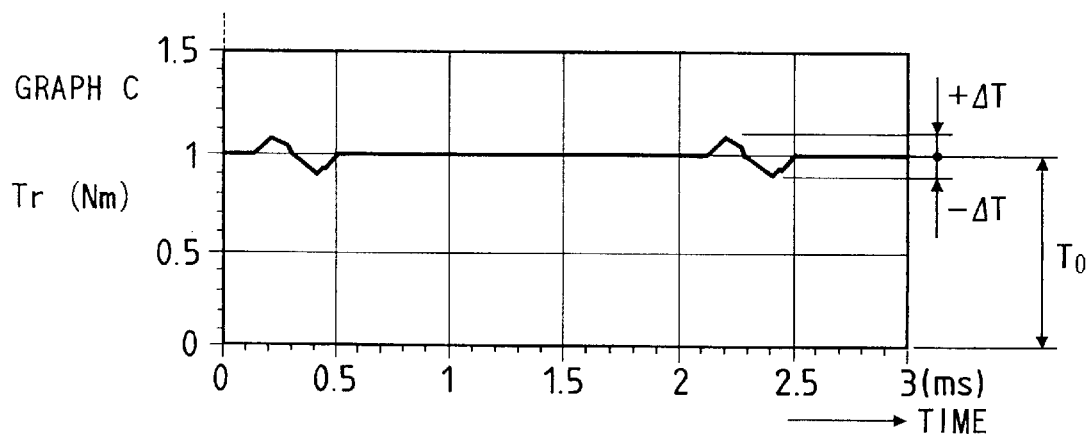

FIG. 4 shows the results of the simulation of the first sensorless control system, In FIG. 4, Graph A shows a q-axis component of the voltage command vector. The value of Vq is substantially equal to ΔVq, −ΔVq, −ΔVq and ΔVq in the first 4 control periods of the compensation period. As seen from Graph A, the pulse wave form during the super-period comprising the former two periods and the pulse wave form during the super-period comprising the latter two periods are bilaterally symmetry with respect to the boundary between the two super-periods. The voltage command vector is compensated with pulse voltage vectors together constituting a wave form formed by arranging such pulse wave forms. Thus, by adding pulse voltage vectors of 30 V which is larger than the estimated error voltage (16 V) during the dead time to the voltage command vector (Vd, Vq), the values of θ and ω are calculated with an improved precision in control periods following the above four control periods, enabling the subsequent voltage command vectors to be calculated based on the calculated values of θ and ω thereby to permit a precise control of the motor.

Graph B shows a q-axis component Iq of the current vector responsive to the voltage command vector. The current vector component Iq has a positive ripple in the first two control periods and a negative ripple in the next two control periods. Since the width of the voltage pulses is sufficiently shorter than the time constant of the stator coils (Lq/Ra=0.04 sec), each of the current ripples have a shape which is substantially equivalent to the time-integral of the pulse voltage or a triangle. The magnitudes Δiq and Δiq' of the positive side and the negative side, respectively, of the current ripple during the first two control periods are substantially equal to each other (that is, Δ1q÷Δ1q'), and the current ripples during the first two control periods and the next two control periods are symmetry. Graph C shows the torque of the PM motor. In response to the current tipples, positive and negative triangular torque ripples are generated symmetrically like the above current ripples. However, the average of the torque ripple during the four control periods was zero, having little effect on the torque control.

Embodiment II

In the first embodiment, if the denominator of the right side of the equation (4) is too small, the value of θ will substantially diverge, causing the precision to be degraded. Though such divergence will not happen if the angular speed is large and the position angle θ is such that the d-axis of the rotary coordinate coincide with the x-axis of the fixed coordinates, such divergence may continue in case of such a torque command or an angular speed as to require a change to the above described inventive auxiliary procedure, which may cause the control performance of PM motor to be lowered.

Figure 5:
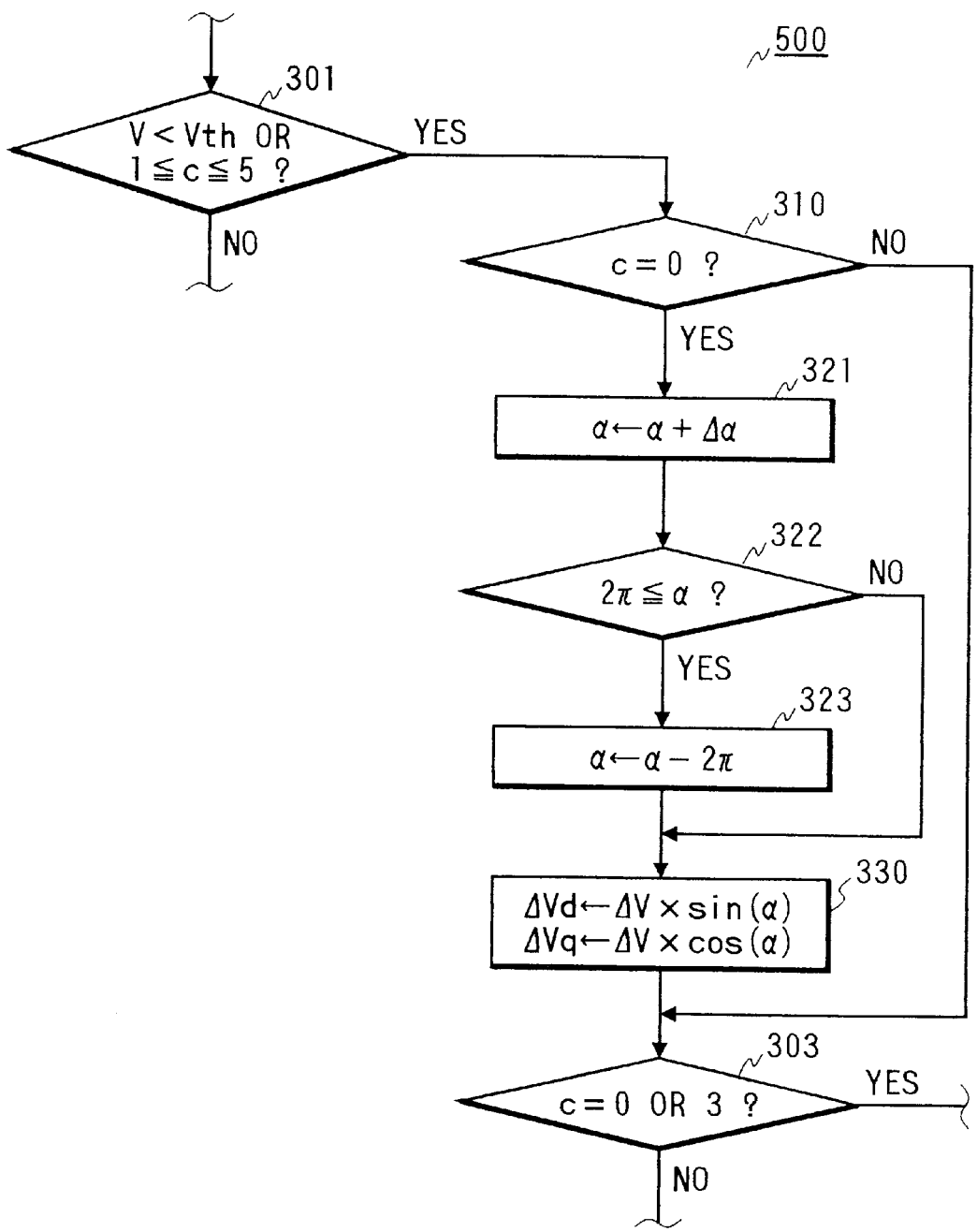
FIG. 5 is a flow chart showing a routine which, when substituted for the steps 301 and 303 of FIG. 3, constitutes a part of a program embodying a second sensorless control method according to the aspect of the invention.

A second sensorless control method which is capable of preventing the equation (4) from diverging will be discussed in the following. FIG. 5 is a flow chart showing a routine which, when substituted for the steps 301 and 303 of FIG. 3, constitutes a part of a program embodying the second sensorless control method according to the aspect of the invention. In FIG. 5, only the case when the test result is YES in step 301 will be described in the following. Then DSP 31 proceeds to step 310 and make a test to see if the pulse count c is zero. If not, that is, if it is a control period after the first period in a compensation period, then DSP 31 proceeds to step 303 thereafter to operate as described in the first embodiment. If the test result is YES, or if it is the first control period in a compensation period, then DSP 31 proceeds to step 321, where DSP 31 executes $$\alpha \leftarrow \alpha + \Delta\alpha$$

where α is the azimuth angle of the pulse voltage vector (ΔVd, ΔVq) obtained in the last control period of the newest compensation period, and Δα is an advancing angle value. In step 322, a test is made to see if $2\pi \leq \alpha$. If not, then DSP 31 proceeds to step 330. If the test result is YES in step 322, then DSP 31 proceeds to step 323, where DSP 31 subtracts 2% from α, puts the result in α in order to prevent the value of α from becoming too large, and proceeds to step 330. In step 330, DSP 31 sets the pulse voltage vector (ΔVd, ΔVq) according to the following equation:

$$\Delta Vd = \Delta V \cdot \sin(\alpha)$$

$$\Delta Vq = \Delta V \cdot \cos(\alpha)$$

The value of ΔV is stored in the ROM 32. DSP 31 proceeds from step 330 to step 303 thereafter to operate as described in conjunction with FIG. 3.

According to this sensorless control method, since the pulse voltage vector (ΔVd, ΔVq) of the last control period in the newest compensation period is rotated by an advancing angle Δα to use the rotated pulse voltage vector in the first control period of the compensation period, the pulse voltage vector (ΔVd, ΔVq) may have every direction. This causes the range of the value that the denominator of the equation (4) can take to become broad. Thus even if the torque command or the angular speed is such that the control flow has to be changed to the auxiliary flow, such a situation can be avoided in which the denominator of equation (4) becomes so small at a specific position angle in a calculation of θ that the accuracy of the calculation is lowered at the specific position angle, resulting in a failure in the motor control.

Embodiment III

Figure 6:
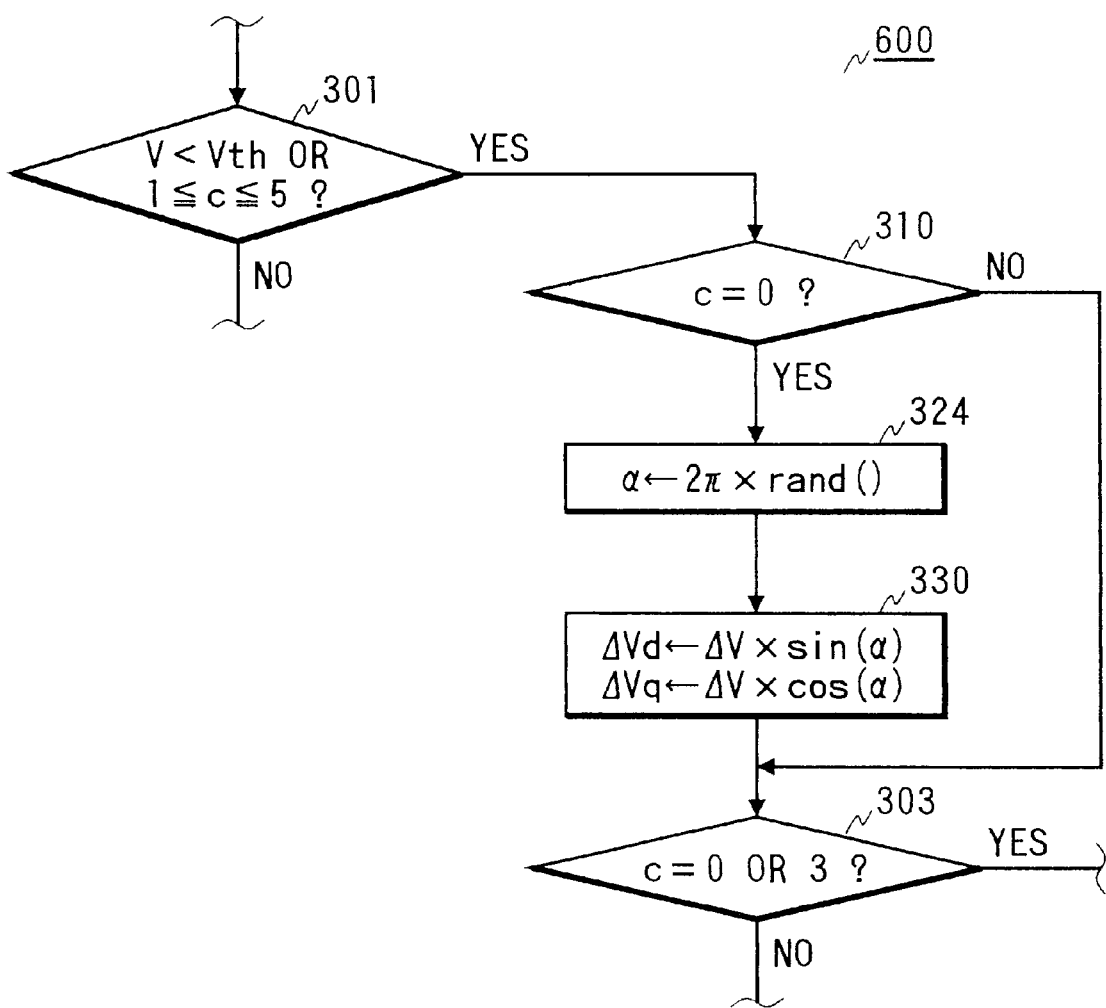
FIG. 6 is a flow chart showing an alternative routine to the routine of FIG. 5.

FIG. 6 is a flow chart showing an alternative routing to the routine of FIG. 5. The routine 600 of FIG. 6 is identical to the routine of FIG. 5 except that the steps 321 through 323 have been replaced with the step 324 in FIG. 6. In this system, the value of α is calculated as follows:

$$\alpha = 2\pi \times \text{rand}(\ )$$

where rand( ) is an random number in the range from 0 to 1. Since α takes an arbitrary value from 0 to 2π, the pulse voltage vector (ΔVd, ΔVq) takes an arbitrary direction at random.

Embodiment IV

Figure 7:
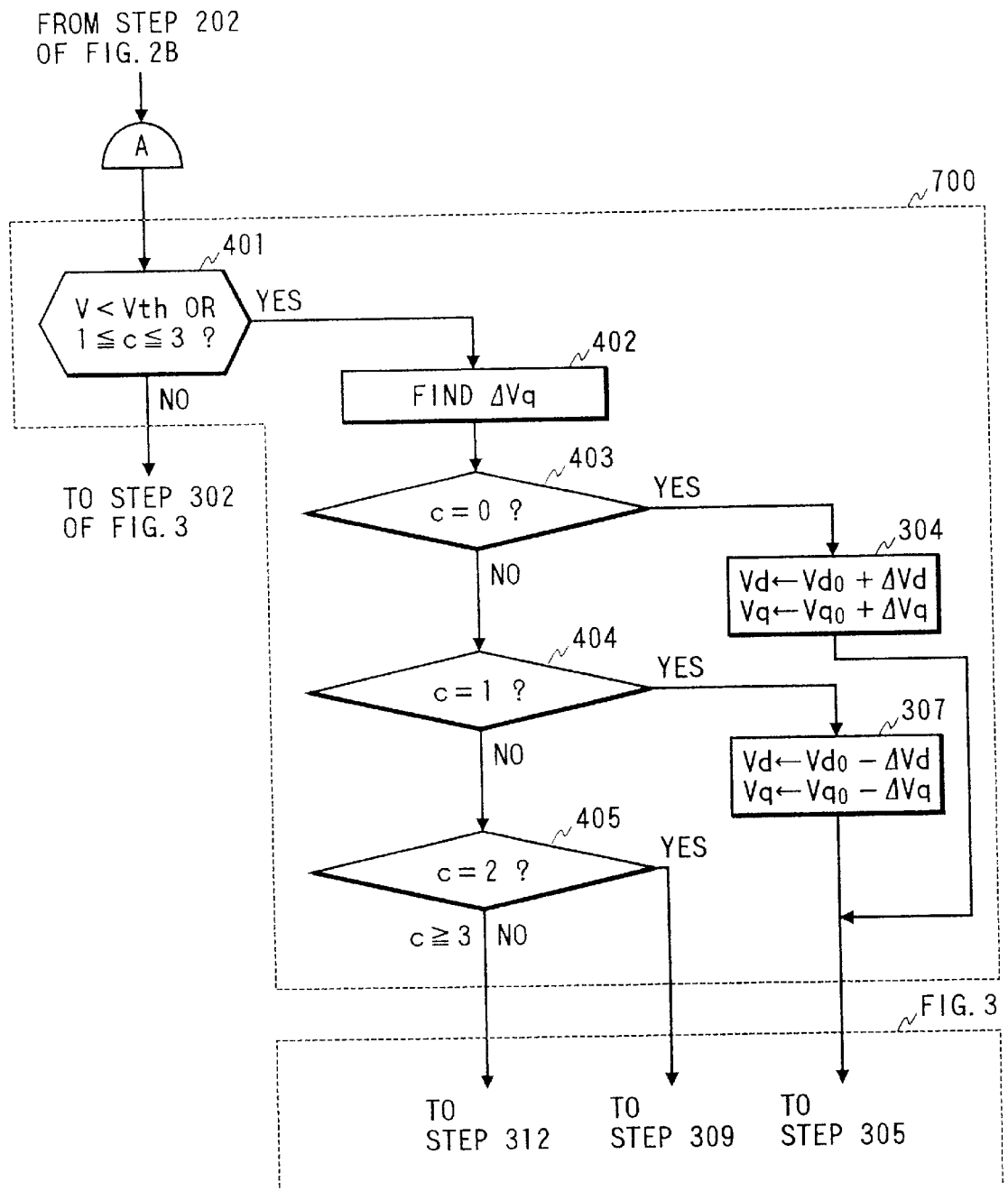
FIG. 7 is a flow chart showing an alternative routine to the routine 300 of FIG. 3.
Figure 8A:
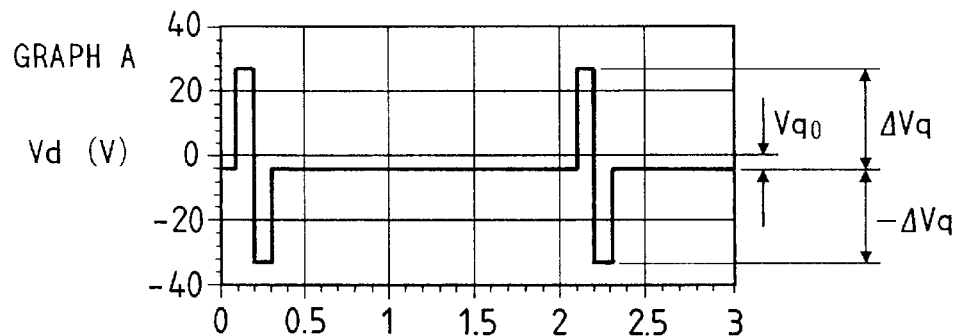
FIGS. 8A–8E are graphs showing the results of the simulation.
Figure 8B:
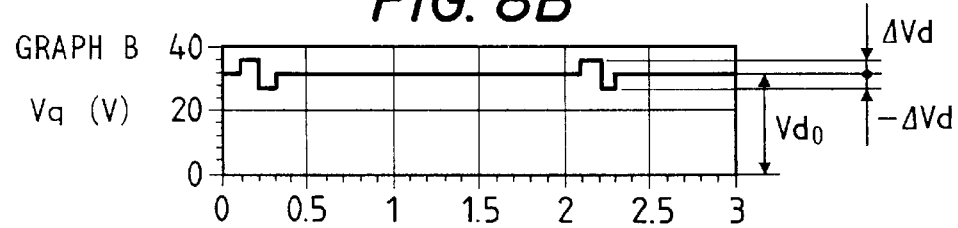
Figure 8C:
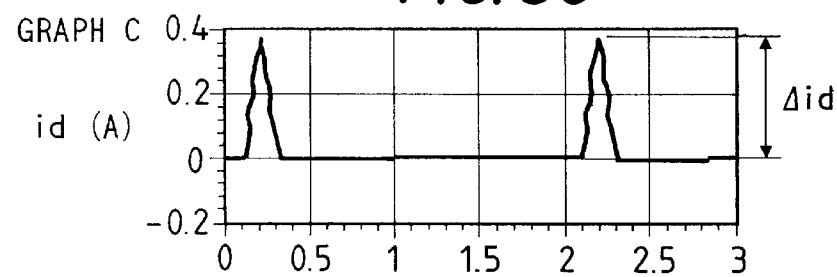
Figure 8D:
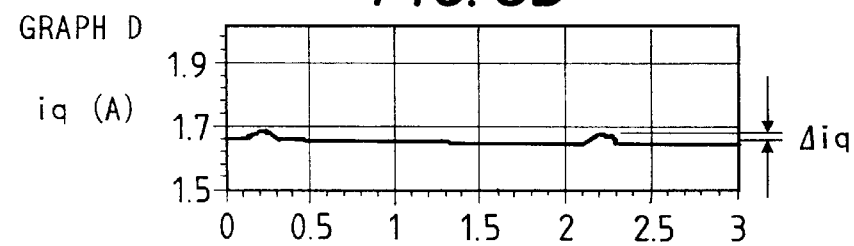
Figure 8E:
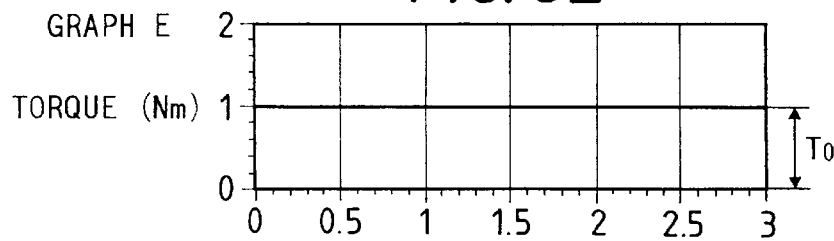

FIG. 7 is a flow chart showing an alternative routine to the routine 300 of FIG. 3. The steps 304 and the steps 307 used in the routines 300 and 700 are identical. In FIG. 7, on completing step 202 of FIG. 2B, DSP 31 enters the routine 700 and proceeds to step 401. In step 401, DSP 31 makes a test to see if the magnitude of the voltage command vector is smaller than the threshold Vth of if $1 \leq c \leq 3$. If not, DSP 31 proceeds to step 302 of FIG. 3. If the test result is YES in step 401. DSP 31 proceeds to step 402, where the component ΔVq of the pulse voltage vector (ΔVd, ΔVq) is calculated using the following equation (The component ΔVd is stored in ROM 32).

$$\Delta Vq = \frac{-(Ld - Lq)iq}{\phi a + (Ld - Lq)id} \cdot \frac{Lq}{Ld} \cdot \Delta Vd \qquad (7)$$

The equation (7) is obtained by solving the above described voltage-current equations (1) and (2) on the PM motor under the condition that the derivative of torque with respect to time equals zero as will be described in the following.

The torque T generated by the PM motor is given by $$T = Pn\phi a \cdot iq + Pn(Ld - Lq)id \cdot iq \qquad (8)$$

Differentiating the equation (8) with respect to time, we obtain $$dT/dt = Pn\phi a(diq/dt) + Pn(Ld-Lq)\{(did/dt)iq + id(diq/dt)\} \quad (9)$$

If the torque T is constant, that is, dT/dt=0, then did/dt and diq/dt satisfy the following relation.

$$\frac{diq}{dt} = \frac{-(Ld-Lq)iq}{\phi a + (Ld-Lq)id} \cdot \frac{Did}{dt}$$

Thus in order to make the torque ripple zero, the current ripples $\Delta id/\Delta t$ and $\Delta iq/\Delta t$ have only to satisfy $$\frac{\Delta iq}{\Delta t} = \frac{-(Ld-Lq)iq}{\phi a + (Ld-Lq)id} \cdot \frac{\Delta id}{\Delta t} \quad (10)$$

In this case, the voltage command vector components Vd and Vq is obtained by substituting the current ripples $\Delta id/\Delta t$ and $\Delta iq/\Delta t$ as did/dt and diq/dt in the voltage-current equations (1) and (2). Accordingly, the pulse voltage vector ($\Delta Vd$, $\Delta Vq$) is obtained by taking the differences between the just obtained component Vd (and Vq) and Vd (and Vq) obtained by substituting pid=0 and piq=0 in the equations (1) and (2) (The latter voltage command vector corresponds to the voltage command vector just before the control flow changes to the auxiliary control flow). Thus obtained pulse voltage vector ($\Delta Vd$, $\Delta Vq$) components are $$\Delta Vd = Ld(\Delta id/\Delta t) \quad (11)$$

$$\Delta Vq = Lq(\Delta iq/\Delta t) \quad (12)$$

The equation (7) is derived from the equations (10) through (12).

Returning now to FIG. 7, in case of the first control period of the compensation period (c=0), DSP 31 proceeds from step 402 to step 304, which causes the voltage command vector (Vd, Vq) components Vd and Vq to change toward the positive side centering around the values stored in Vd0 and Vq0. In case of the second control period of the compensation period (c=1), DSP 31 proceeds from step 402 to step 307, which causes the voltage command vector components Vd and Vq to change toward the negative side centering around the values of Vd0 and Vq0. In this way, if the flow changes from the usual control flow to the auxiliary control flow, then the voltage command vector (Vd, Vq) is compensated with pulse voltage vectors the ratio of which is 1:−1 in a period comprising the first two control periods. The procedure after steps 304 and 307 is common with that of FIG. 3.

In the third control period of the compensation period (c=2), DSP 31 proceeds from step 405 to step 309 of FIG. 3. In each of the control periods after the third control period (3≦c). DSP 31 proceeds from step 405 to step 312 of FIG. 3.

A simulation concerning operation of the just described control system has been conducted using a motor of the same specifications under the same condition as in case of the first embodiment. As for the pulse voltage vector ($\Delta Vd$, $\Delta Vq$), $\Delta Vd$=30 V and for the component $\Delta Vq$, the value calculated from the equation (7) was used.

FIG. 8 a graph showing the results of the simulation. In FIG. 8. Graph A shows a d-axis component Vd of the voltage command vector on the rotary coordinates. The component Vd is a pulse stream comprising $\Delta Vd$ and $-\Delta Vd$ in a super-period comprising two continuous control periods. Graph B shows a q-axis component Vq of the voltage command vector on the rotary coordinates. The component Vq is a pulse stream comprising $\Delta Vq$ and $-\Delta Vq$ in a super-period comprising two continuous control periods. Graphs C and D shows d-axis and q-axis components id and iq for the current vector on the fixed coordinates which is responsive to the voltage command vector. In Graphs C and D, triangular current ripples appear in the positive side due to the pulse streams in the two super-periods. Graph E shows the torque of the PM motor. The torque characteristic was flat and free from ripple.

As described above, by adding pulse voltage vectors of 30 V which is larger than the estimated error voltage (15 V) during the dead time to the voltage command vector (Vd, Vq), the values of θ and ω are calculated with an improved precision, that is, the precision of detection is prevented from degrading due to the error voltage (15 V). The subsequent voltage command vectors can be calculated based on the precisely calculated values of θ and ω thereby to permit a precise control of the motor. Further, the average of the torque ripple during the compensation control periods is zero, having little effect on the torque control and yielding a good torque control characteristic.

It is noted that a procedure for comparing the absolute value of the denominator in equation (4) with a predetermined lower limit and adjusting the magnitude of the pulse voltage vector in response to the result of the comparison may be inserted between the steps 301 and 303 of FIG. 3 or between the steps 401 and 402 of FIG. 7. Specifically, If the absolute value of the denominator of equation (4) is smaller than the predetermined lower limit, then a compensating vector ($\Delta vd$, $\Delta vq$) for the pulse voltage vector is added to the pulse voltage vector ($\Delta Vd$, $\Delta Vq$) (In the fourth embodiment, a compensating value $\Delta vd$ is added to $\Delta Vd$, and $\Delta Vq$ is calculated from the new $\Delta Vd$). The resultant pulse voltage vector is used for the pulse voltage vector for the compensation period. If the absolute value of the denominator of equation (4) is not smaller than the predetermined lower limit, then the just described adjustment of the pulse voltage vector is omitted. By doing this, the problem of the divergence of equation (4) (the degration in the calculation accuracy of θ) is solved.

Embodiment V

Figure 9:
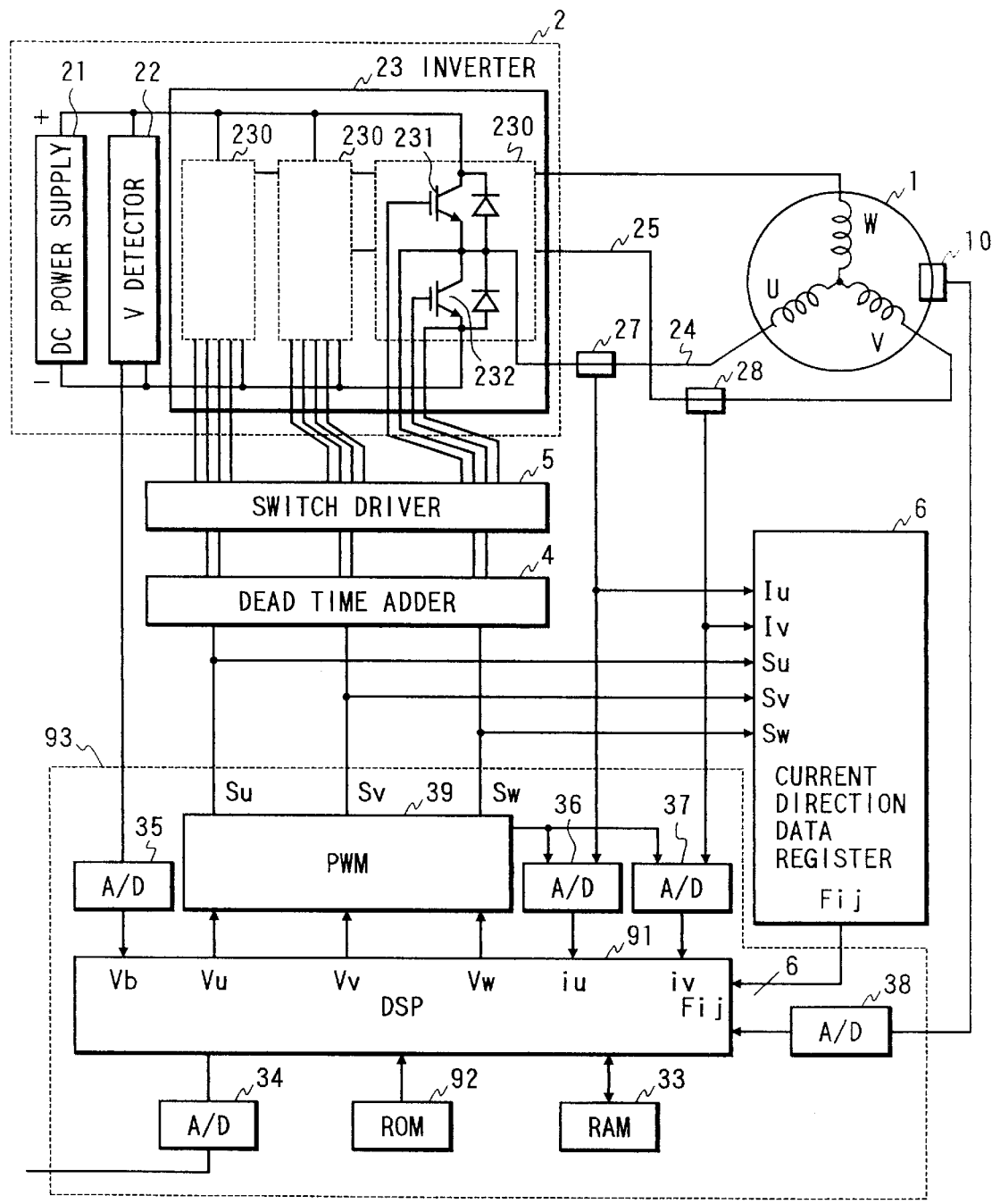
FIG. 9 is a block diagram showing a permanent magnet synchronous motor system according to a fifth illustrative embodiment of another aspect of the invention.

FIG. 9 is a block diagram showing a permanent magnet synchronous motor system according to a fifth illustrative embodiment of another aspect of the invention. FIG. 9 is identical to FIG. 1 except the following points: a dead time adder 4, a switch driver 5 and a current direction data register 6 has been added, and a digital signal processor (DSP) 91 and a read only memory (ROM) 92 have been substituted for the DSP 31 and ROM 32, respectively in FIG. 9. Like elements are denoted by like reference numerals, and their description will be omitted.

In FIG. 9, the output terminals Su, Sv and Sw of the PWM 39 are connected to respective input terminals of each of the dead time adder 4 and the current direction data register 6. Three pairs of output terminals of the dead time adder 4 are connected to respective input terminals of the switch driver 5, which has a pair of output terminals thereof associated with each input terminal thereof and connected to the switching elements 231 and 232 of the corresponding phase in the inverter 23. The outputs of the current detectors 27 and 28 are also connected to respective input terminals of the current direction data register 6. 6-bit output of the register 6 is connected to DSP 91. Though the inverter 23 of FIG. 9 is identical to that of FIG. 1, only the U-phase portion of the inverter 23 is shown in detail for the sake of subsequent description of this embodiment.

On receiving the PWM signals Su, Sv and Sw from the PWM 39, the dead time adder 4 supplies the switch driver 5 with three pairs of switch control signals corresponding to the U, V and W phases. Specifically, in response to each of the PWM signals the dead time adder 4 generate a pair of switch control signals by adding same time lags to the rising edges and the falling edges of the PWM signal and the inverted version of the PWM signal such that the switching elements 231 and 232 controlled by the pair never become simultaneously conductive at any moment.

The switch driver 5 outputs a pair of signals in response to each of the switching control signals to a switching element associated with the switching control signals.

The current direction data register 6 supplies DSP 91 with 6 current direction bits Fu1, Fu2, Fv1, Fv2, Fw1 and Fw2 detected in two dead times of each control period for each phase on the basis of the phase currents Iu and Iv and the PWM signals.

In this embodiment, the DSP 91 calculates the rotor position angle θ from the DC power voltage Vb, the phase currents iu and iv and the estimated phase voltages (which will be detailed later) according to an aspect of the invention, and generates the inverter switching control signals in response to the torque command signal from the out side as described in any of the above described illustrative embodiments.

Figure 10:
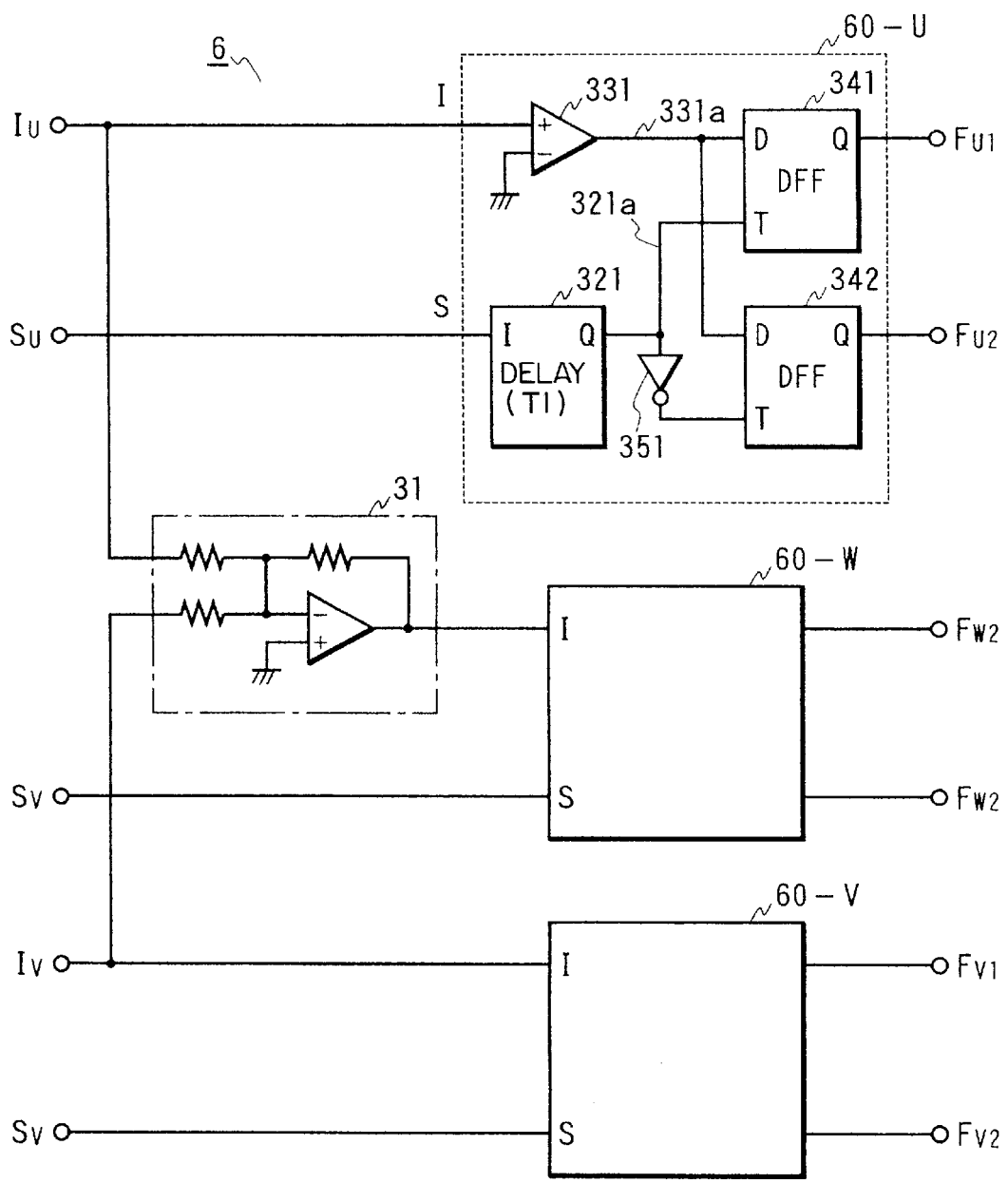
FIG. 10 is a block diagram showing, in a detailed form, an exemplary arrangement of the current direction data register of FIG. 9.

FIG. 10 is a block diagram showing, in a detailed form, an exemplary arrangement of the current direction data register of FIG. 9. In FIG. 9, the current direction data register 6 comprises three data registers 60-U, 60-V and 60-W associated with the U, V and W phases respectively and an adder 31 whose gain is −1 and which receives the phase current values Iu and Iv from the current detector 27 and 28 and outputs estimated current value for the W phase. Since the data registers 60 have the same constitution, only the data register 60-U is shown in detail. Each data register 60-i (i=U, V or W) has I-input and S-input terminals for taking in a detect phase current and a PWM signal associated with the data register 60-i and output terminals F11 and F12 for outputting current direction signals indicative of the directions of i-phase currents detected at the center of each of the dead times associated with the rising and falling edges of a PWM signal S-i. As for the phase currents, the data registers 60-U and 60-V receive the phase current Iu and Iv, whereas the data register 60-W receives the estimated current value for the W phase from the adder 31 instead of the phase current Iw.

Each of the data registers, 60-i, comprises a delay circuit 321 for receiving a PWM signal Si from the PWM 39 via the S-input terminal and outputting a delayed PWM signal; a voltage comparator 331 for providing a signal indicative of the direction of the signal input via the I-input terminal: two D-type flip-flops (DFF) 341 and 342 for outputting, from the Q output, the value of D input of the time of the rising edge of the T input, the D-inputs being connected to the voltage comparator 331 output, and T-input of DFF 341 being connected to the Q-output of the delay circuit 321; and an inventer 351 for supplying the inverted version of the Q output of the delay circuit 321 to the T-input of DFF 342.

The delay circuit 321 comprises a shift register (not shown) and delays the PWM signal Si for a period (T1) equivalent to the sum of half of the dead time added by the dead time adder 4 and the total delay time due to the switch driver 5, a switching element 231 or 232 in the inverter 23, a current detector 27 and a voltage comparator 331. The delay circuit 321 is so adjusted that the DFFs 341 and 342 associated with the circuit 321 can register the value of the signal from the comparator 331 at the center of each dead time for the rising and the falling edges of the U phase voltage.

Figure 11:
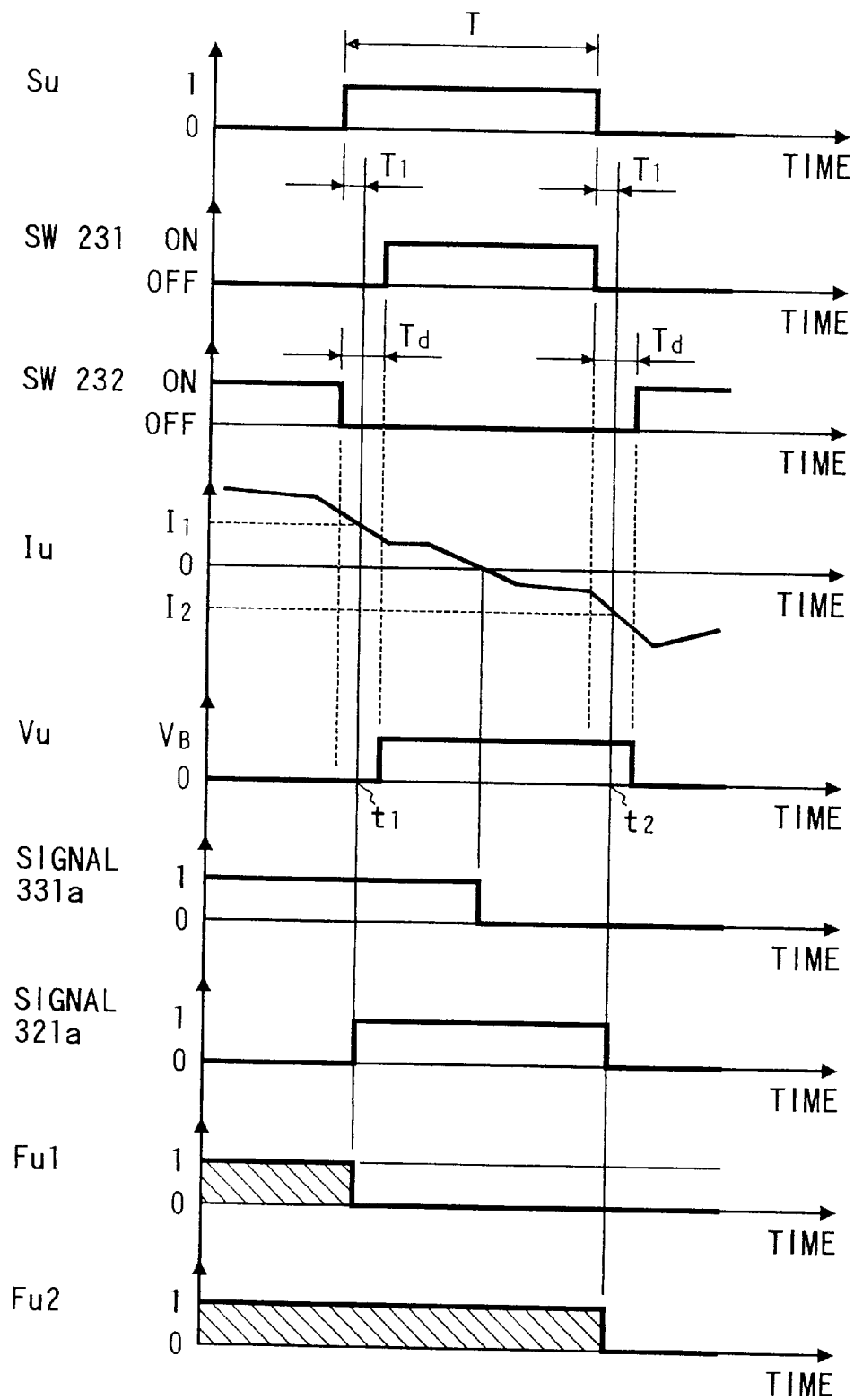
FIG. 11 is a timing chart for describing the operation of the current direction data register of FIGS. 9 and 10 with respective to the U phase winding.

FIG. 11 is a timing chart for describing the operation of the current direction data register of FIGS. 9 and 10 with respective to the U phase winding. In FIG. 11, Td indicates a dead time or short-preventing period, which corresponds to a period from the turning off of the switching element 232 to the turning on of the switching element 231 and a period from the turning off of the switching element 231 to the turning on of the switching element 232.

In the wave form of Iu, it is assumed that a positive value of Iu indicates that the phase current Iu flows from the inverter 23 to the U-phase coil, and vice versa. As seen from the wave form of Iu and the signal 331a, the voltage comparator 331 outputs logical "1" for Iu<0 logical "0" for Iu≦0.

Figure 13:
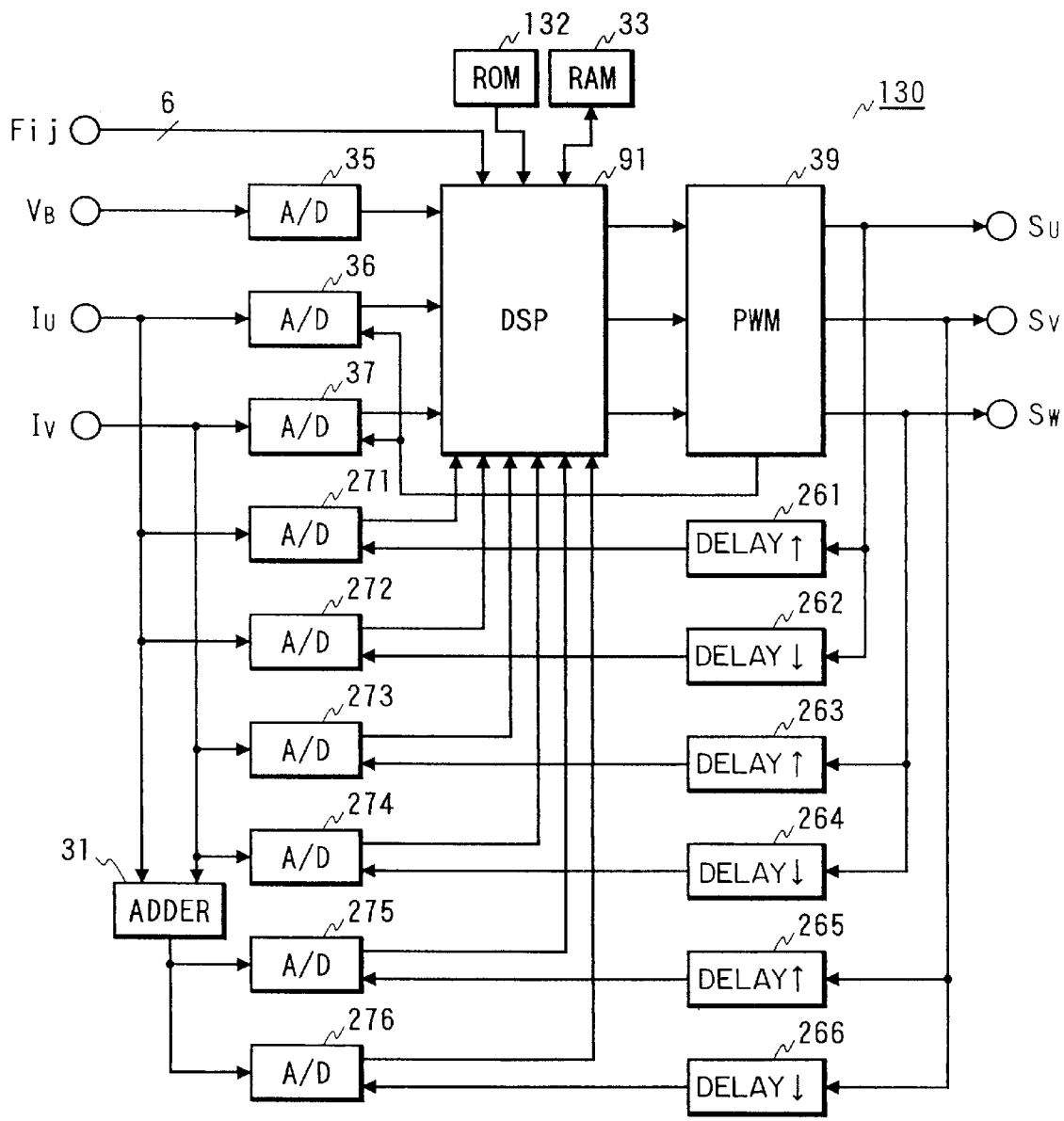
FIG. 13 is a block diagram showing an exemplary arrangement of an alternative controller which can be substituted for the controller 93 of FIG. 9.
Figure 14A:
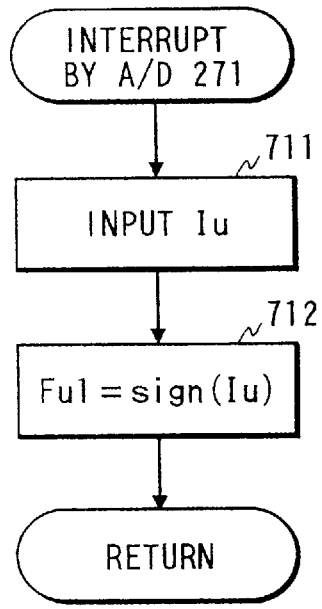
FIGS. 14A–14F show flow charts of procedures executed under respective interrupt routines associated with A/D converters 271 through 276.
Figure 14B:
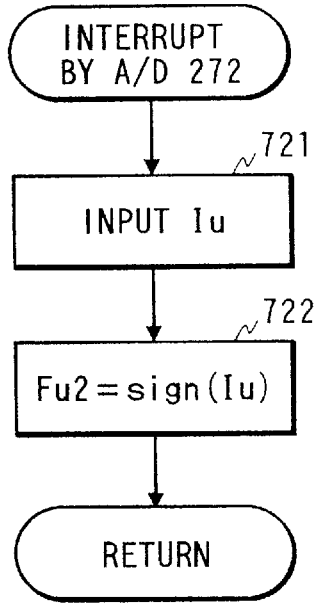
Figure 14C:
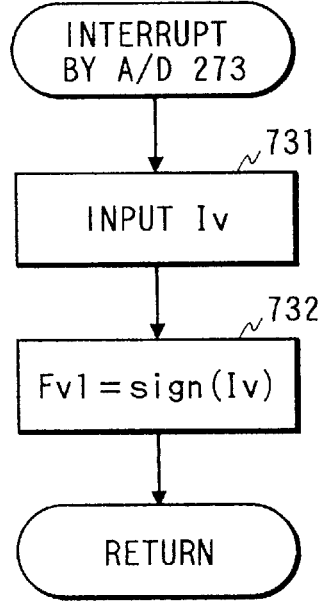
Figure 14D:
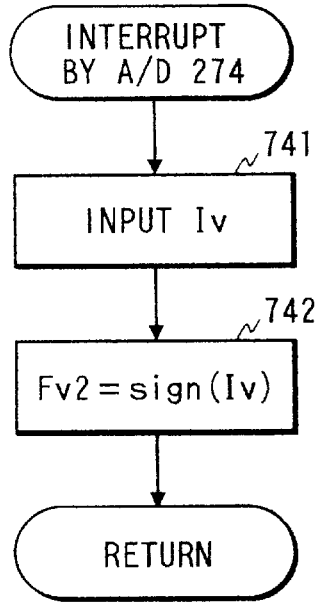
Figure 14E:
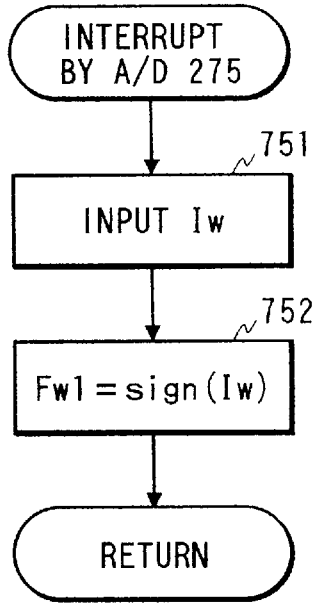
Figure 14F:
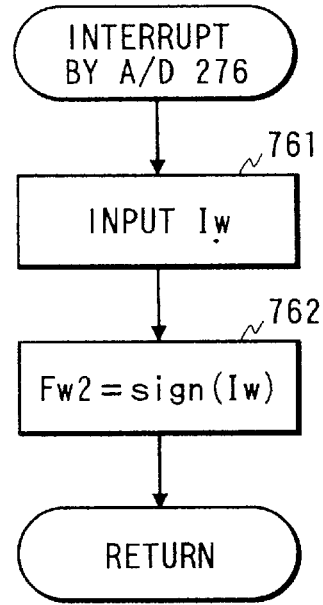

T1 is a delay time of the delay circuit 321. It is noted that T1 is shown as equal to Td/2 because for the sake of the simplicity of description and the clearness of the drawing FIG. 13 is drawn on the assumption that the above-mentioned total delay time due to the switch driver 5, a switching element 231 and 232 in the inverter 23, a current detector 27 and a voltage comparator 331 is zero. Times t1 and t2 are times when T1 has elapsed respectively from a rising edge and a falling edge of the PWM signal Su. At times t1 and t2, the signal 331a is registered as current direction signal Fu1 and Fu2 in DFF 341 and 342, respectively. I1 and I2 is the values of the phase current Iu at times t1 and t2, respectively.

In the wave forms of Fu1 and Fu2, a hatched part indicates that the logical value of the part of the signal should not be cared.

The current direction signals Fu1, Fu2, Fv1, Fv2, Fw1 and Fw2 of FIG. 10 are denoted en bloc as Fij in FIG. 9. That is, Fij=(Fij: i=u, v, w and j=1, 2). The suffix j=1 indicates the rising edge of a switch control signal and j=2 indicates the falling edge of the switch control signal.

Figure 12:
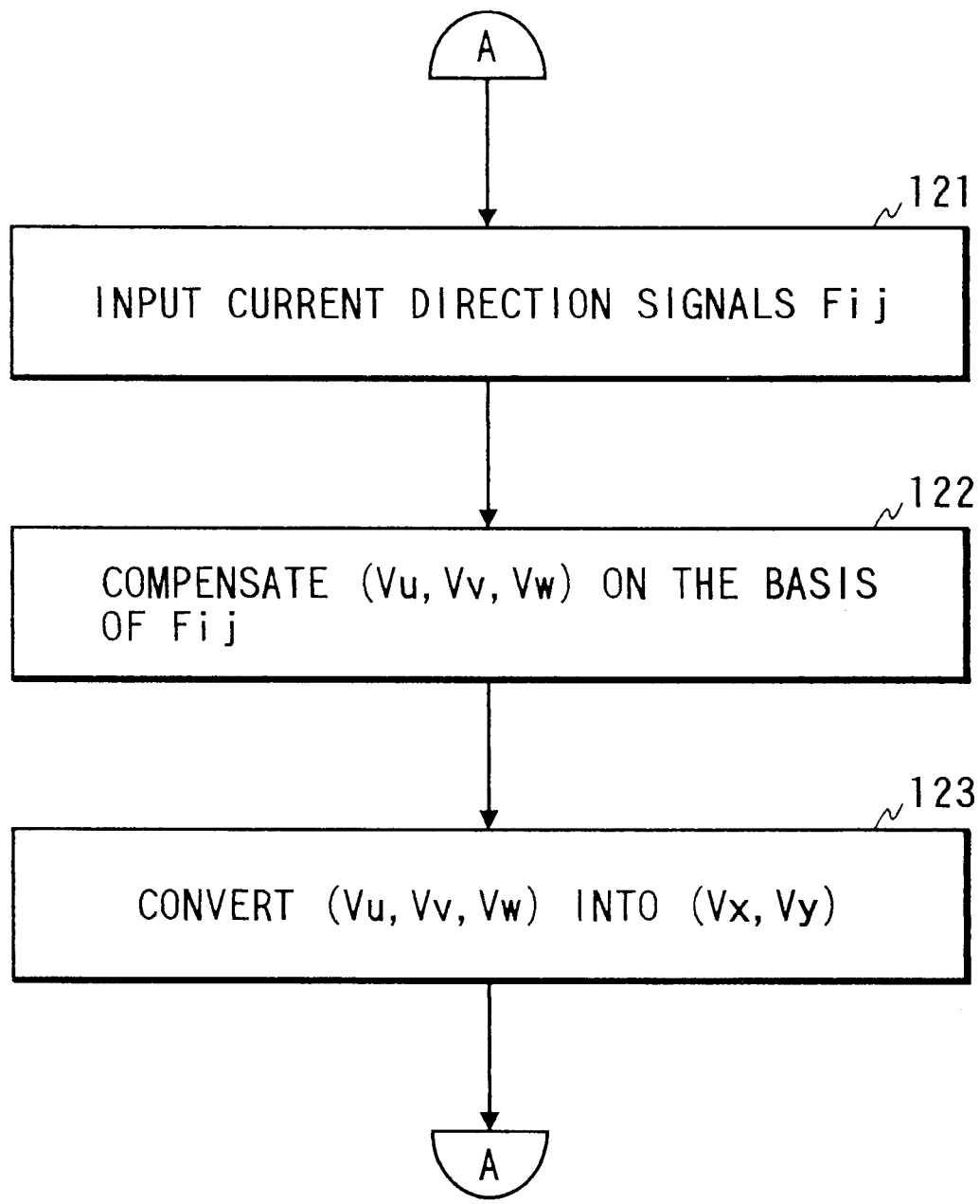
FIG. 12 is a flow chart showing a part of the procedure which, when inserted in the path denoted with A enclosed with a circle shown in FIG. 2B, constitutes a complete interrupt routine used in the fifth illustrative embodiment.

FIG. 12 is a flow chart showing a part of the procedure which, when inserted in the path denoted with A enclosed with a circle shown in FIG. 2B, constitutes a complete interrupt routine used in this illustrative embodiment. The whole procedure of this embodiment comprises the procedures of FIGS. 2A, 2B and 12. For this reason, only the procedure of FIG. 12 will be described in the following.

After the execution of step 202 of FIG. 2B, DSP 91 proceeds to step 121 of FIG. 12, where DSP 91 inputs the current direction signals Fij from the current direction data register 6. In step 122, DSP 91 calculates an estimated phase voltage vector (EPVu, EPVv, EPVw) from the voltage command vector (Vu, Vv, Vw), a phase voltage offset vector (ΔVu, ΔVv, ΔVw), and the current direction data Fij. In step 123, DSP 91 converts the estimated phase voltage vector (EPVu, EPVv, EPVw) into the 2-phase voltage vector (Vx, Vy) defined on the fixed coordinates. Thereafter, DSP 91 proceeds to step 203 of FIG. 2B to use the found (Vx, Vy) for the calculation of the rotor position angle θ.

The conversion in step 123 will be detailed with respect to the U phase. The conversion is achieved according to Table 1.

TABLE 1

| Possible Cases | Fu1 | Fu2 | EPWu | EPVu |
|---|---|---|---|---|
| I1 < 0, I2 < 0 | 0 | 0 | T + Td | Vu + ΔVu |
| I1 < 0, I2 > 0 | 0 | 1 | T | Vu |
| I1 > 0, I2 < 0 | 1 | 0 | T | Vu |
| I1 > 0, I2 > 0 | 1 | 1 | T − Td | Vu − ΔVu |

In Table 1, EPWu is the pulse width of control pulse Su which must have been applied to the U-phase coil in the last control period (EPWu is referred to as the "estimated pulse width"); EPVu is the average, per control period, of the integration of the phase voltage which must have been applied to the U-phase coil for a period of EPWu in the last control period; Td is the above mentioned delay time (EPVu is referred to as the "estimated phase voltage" of U phase); Vu is the U-phase component of the voltage command vector (Vu, Vv, Vw); and ΔVu is the average, per control period, of the integration of the phase voltage applied to the U phase for a period of Td. That is, $$\Delta Vu = Vb \cdot (Td/Tc)$$

where Vb is the dc voltage supplied by the dc power supply 21, and Tc is the period of a control period.

In step 122, DSP 91 finds:

$$EPVu = Vu + \Delta Vu \text{ if } Fu1 = FU2 = 0,$$

$$EPVu = Vu - \Delta Vu \text{ if } Fu1 = Fu2 = 1,$$

EPVu=Vu, otherwise.

In a conventional system, even if Vu+ΔVu is used as the voltage command vector component Vu according to the decision that the average of the inverter output during a certain control period will decrease by ΔVu, if the direction of the phase current have changed during the control period, then the output of the inverter will have been too large by ΔVu because no error occurs in the inverter in this case. However, this too large value will have been used for the calculation of θ.

On the other hand, if the phase current direction is changed during a control period, the command vector is used as it is according to this embodiment. Therefore, the fifth embodiment permits the calculation of θ to be performed with an improved precision.

As described above, the fifth embodiment becomes effective in case when the phase current changes its direction during a control period, that is, in case when the ripple current is relative large as compared with the phase voltage and the voltage error due to the dead time is not negligible as compared with the voltage command value. In other word, from the point of operating condition of motor, this embodiment is especially effective when the motor is operated at a low speed and with a low torque.

Though it is assumed that the phase current direction will remain unchanged during any dead time, even if the phase current direction will have changed during any dead time, the phase currents are registered at the center of the dead time so as to minimize the expectation of the estimated errors.

Embodiment VI

Though the current direction data register 6 have been realized in terms of hardware, it may be realized by using software. In this case, the controller 93 in FIG. 9 has to be replaced with a controller of FIG. 13, omitting the current direction data register 6. In FIG. 13, the controller 130 is identical to the controller 93 of FIG. 9 except that 6 delay circuits 261 through 266, 6 A/D converters 271 through 276, and an adder 31 have been added. Like elements are denoted by like reference numerals in FIGS. 13 and 8. The adder 31 is identical to that of FIG. 10. As described above, the delay time (T1) of each delay circuit equals the sum of Td/2 and the total delay time due to the switch driver 5, a switching element 231 or 232 in the inverter 23, a current detector 27 and a voltage comparator 331 is zero.

The phase current Iu is supplied to the A/D converters 271 and 272, and the phase current Iv is supplied to the A/D converters 273 and 274. The phase currents Iu and Iv are also supplied to the two input terminals of the adder 31, which in turn supplies a W-phase current to the input terminals of the A/D converters 275 and 276.

In operation, if the PWM 39 outputs a set of PWM signals or switching control signals, Su, Sv and Sw, then the control signal Su, Sv and Sw are also supplied to 3 pairs of the timers 261 through 266, respectively. In response to the rising edges of the switching control signals, the delay circuits 261, 263 and 265 apply triggers, T1 sec later, to respective A/D converters 271, 273 and 275, which in turn immediately samples the phase currents and send the A/D-converted phase currents to DSP 91 by means of an interrupt. In response to the falling edges of the switching control signals, the delay circuits 262, 264 and 266 apply triggers, T1 sec later, to respective A/D converters 272, 274 and 276, which in turn immediately samples the phase currents and send the A/D-converted phase currents to DSP 91 by means of an interrupt.

FIG. 14 shows flow charts of procedures executed under respective interrupt routines associated with A/D converters 271 through 276. In FIG. 14, if the DSP 91 receives an interrupt from one of the A/D converters 271 through 276, than DSP 91 begins with the step 7i1 (i=one of 1 through 6), where DSP 91 takes in the output of the A/D converter from which DSP 91 has received the interrupt. In step 7i2, DSP 91 stores sign (the value of the output) in the memory location associated with the A/D converter. "sign(x)" indicates the sign of "x".

According to this arrangement, the A/D converters sample the phase currents Iu and Iv at times t1 and t2 as in case of the embodiment V. By an interrupt process started just after the sampling, DSP 91 takes in the A/D converted sample (the value of the phase current at the center of each dead time for each phase) and obtains the sign of the taken-in value through a comparison. Thus, this arrangement provides the same function as that of the current direction data register 6 of FIG. 9.

Many widely different embodiments of the present invention may be constructed without departing from the spirit and scope of the present invention. It should be understood that the present invention is not limited to the specific embodiments described in the specification, except as defined in the appended claims.

What is claimed is:

1. A sensorless control method with an improved control accuracy in reduced speed or torque operation in a system wherein a permanent magnet synchronous motor having a plurality of phase coils is controlled in each control period through a voltage command vector comprising the same plurality of components or voltage commands, the method comprising the steps, executed in each control period, of:

obtaining a phase current vector by detecting phase currents;

calculating a position angle and an angular speed of a rotor of said motor by using said obtained phase current vector and the voltage command vector having been calculated in the last control period (hereinafter, referred to as "the previous voltage command vector");

calculating said voltage command vector from said phase current vector, said position angle, angular speed and a torque command given from the outside; and using said voltage command vector for controlling said motor, the method including the step, prior to said step of calculating a position angle and an angular speed, of:

in response to a determination in a certain control period that the previous voltage command vector is smaller than a predetermined threshold level, executing, for a plurality of continuous super-periods comprising subsequent control periods in a compensation period beginning with said certain control period, the following steps of:

performing a same number of additions and subtractions, one per control period, of a pulse voltage vector to and from the previous voltage command vector to yield a compensated voltage command vector for each of said subsequent control periods; and in each of said subsequent control periods, using said compensated voltage command vector for controlling said motor.

2. A method as defined in claim 1, wherein:

said plurality of continuous super periods comprises two continuous super-periods;

said additions and subtractions are the same in number for each of said two continuous super-periods; and a wave-form obtained by integrating the pulse voltage vectors added and subtracted during said two continuous super-periods is symmetry in the time direction with an axis of symmetry coinciding with on the boundary of said two super-periods and with a half appearing on the positive side and the other half appearing on the negative side.

3. A method as defined in claim 1, wherein:

said additions and subtractions are the same in number for each of said continuous super-periods; and in a wave-form obtained by integrating the pulse voltage vectors added and subtracted during said two continuous super-periods, wave-forms of two adjacent ones of said super-periods are symmetry in the time direction.

4. A method as defined in any of claims 1 through 3, wherein said step of performing a same number of additions and subtractions includes the step of:

changing the direction of said pulse voltage vector in each of said addition and subtraction.

5. A method as defined in claim 4, wherein said step of changing the direction of said pulse voltage vector comprises the step of:

rotating said pulse voltage vector by a predetermined angle in each of said addition and subtraction.

6. A method as defined in claim 4, wherein said step of changing the direction of said pulse voltage vector comprises the step of:

determining said direction by using a random number.

7. A method as defined in claim 4, wherein said pulse voltage vector is determined by solving a voltage equation on said permanent magnet synchronous motor under the condition that a differential of the torque of said motor is zero.

8. A method as defined in claim 1, wherein said step of performing a same number of additions and subtractions includes the step of:

in response to a determination that a tangent of said position angle will diverge, adding a predetermined offset vector to said pulse voltage vector.

9. A method as defined in claim 1, wherein said determination includes a determination that a torque voltage component of the previous voltage command vector is smaller than a threshold level preset for the torque voltage component of the voltage command vector.

10. A sensorless control system which is capable of calculating a rotor position angle with a raised precision and is used for a permanent magnet synchronous motor having a plurality (N) of phase coils each controlled through a pair of switching control signals, the system comprising:

means for calculating a voltage command vector (V) from a torque command given from the outside;

means responsive to said voltage command vector (V) for generating a PWM control signal (S1) for each phase coil; and means, responsive to said PWM control signal for each phase coil, for generating said pair of switching control signals with a dead time set at each of rising and falling edges, the system further comprising:

means for obtaining phase currents of said plurality of phase coils;

means, responsive to said PWM control signal for each phase coil, for registering a pair of directions of said obtained phase current for the phase coil at a center of each of said dead times for rising and falling edges;

means, operative on the basis of said pair of phase current directions for each phase coil, for estimating a component (VPi), for the phase coil, of the voltage command vector (VP) having been calculated in the last control period (hereinafter, referred to as "the previous voltage command vector") by using a corresponding component ($\Delta$Vi) of phase voltage offset vector ($\Delta$V) to yield a component (EPVi) of a estimated phase voltage vector (EPV), where "i" is a suffix indicative of the phase ($1 \leq i \leq N$); and means for calculating a position angle and an angular speed of a rotor of said motor by using said obtained phase currents and said estimated phase voltage vector (EPV).

11. A system as defined in claim 10, wherein N=3, and i=(u, v, w), and wherein said means for obtaining phase currents includes:

means for adding phase currents Iu and Iv to yield phase current Iw, and said means for registering a pair of directions of said obtained phase current comprises for each phase (i);

means for comparing associated one (Ii) of said obtained phase currents with a reference value to yield a direction signal indicative of the direction of said phase current (Ii);

means for delaying an associated one (Si) of said PWM control signals by half of said dead time to provide a first trigger signal;

means for inverting said first trigger signal to provide a second trigger signal;

means, responsive to said first trigger signal, for registering and outputting a first value of said direction signal; and means, responsive to said second trigger signal, for registering and outputting a second value of said direction signal.

12. A system as defined in claim 10, wherein N=3, and i={u, v, w}, and wherein said means, responsive to said PWM control signal for each phase coil, for registering a pair of directions of said obtained phase current comprises for each phase (i):

means, responsive to a rising edge of an associated one (Si) of said PWM control signals, for outputting a first trigger signal half of said dead time after said rising edge;

means, responsive to a falling edge of an associated one (Si) of said PWM control signals, for outputting a second trigger signal half of said dead time after said falling edge; and two means, responsive to one of said first and second trigger signals, for sampling and converting a value of an associated one (Ii) of said obtained phase currents into a digital current value, and then sending an interrupt signal to said means for estimating a component (VPi) of the voltage command vector so that said component estimating means can take in said digital current value, wherein said component estimating means further comprises:

means for taking in said digital current value in response to said interrupt signal; and means for obtaining a direction of associated phase current (Ii) on the basis of said digital current value.

* * * * *